United States Patent
Yu et al.

(10) Patent No.: US 7,764,756 B2
(45) Date of Patent: Jul. 27, 2010

(54) SYNCHRONIZATION ACQUIRING DEVICE AND SYNCHRONIZATION ACQUIRING METHOD

(75) Inventors: Zhan Yu, Singapore (SG); Yew Soo Eng, Singapore (SG); Suguru Fujita, Tokyo (JP)

(73) Assignee: Panasonic Corporation, Osaka (JP)

( * ) Notice: Subject to any disclaimer, the term of this patent is extended or adjusted under 35 U.S.C. 154(b) by 734 days.

(21) Appl. No.: 11/718,559

(22) PCT Filed: Aug. 29, 2006

(86) PCT No.: PCT/JP2006/316920

§ 371 (c)(1),
(2), (4) Date: May 3, 2007

(87) PCT Pub. No.: WO2007/026667

PCT Pub. Date: Mar. 8, 2007

(65) Prior Publication Data

US 2009/0110128 A1      Apr. 30, 2009

(30) Foreign Application Priority Data

Aug. 31, 2005 (JP) .............................. 2005-252140
Aug. 28, 2006 (JP) .............................. 2006-231094

(51) Int. Cl.
*H04L 7/00* (2006.01)

(52) U.S. Cl. .................. 375/354; 375/149; 375/147; 375/324; 375/340

(58) Field of Classification Search ................. 375/354, 375/146, 147, 324, 340

See application file for complete search history.

(56) References Cited

U.S. PATENT DOCUMENTS

2005/0013392 A1   1/2005 Mizugaki et al.

FOREIGN PATENT DOCUMENTS

JP           200539392      2/2005

OTHER PUBLICATIONS

International Search Report dated Oct. 31, 2006.
Jongok Oh et al., "A Rapid Acquisition Scheme for UWB Signals in Indoor Wireless Channels," Proceeding of Wireless Communications and Networking Conference, vol. 2, pp. 1143-1147, Mar. 21-25, 2004.
E. Homier, et al., "Rapid Acquisition of Ultra-Wideband Signals in the Dense Multipath Channel," IEEE UWBST2002, 5 pages total, May 2002.

(Continued)

*Primary Examiner*—Shuwang Liu
*Assistant Examiner*—Kabir A Timory
(74) *Attorney, Agent, or Firm*—Dickinson Wright PLLC

(57) ABSTRACT

A synchronization acquiring device and method for realizing synchronization acquisition at high speed equivalent to that of parallel search with a simple constitution similar to that of series search. A synchronization acquiring device (100) has a superposition template acquiring section (120) for acquiring superposition template signals generated by superposing template signals on one another, a first correlation detecting section (110) for detecting preliminary correlation matching between a superposition template signal and the received signal and, if the preliminary correlation matching is not detected, detects preliminary correlation matching after replacing the superposition template signal with another superposition template signal, and a second correlation detecting section (130) detects, if preliminary correlation matching is detected, the final correlation matching between a superposition template signal out of the template signals and the received signal.

22 Claims, 19 Drawing Sheets

OTHER PUBLICATIONS

R. Fleming, "Rapid Acquisition for Ultra-Wideband Localizers," IEEE UWBST2002, 5 pages total, May 2002.

E. Homier, et al., "Hybrid Fixed-Dwell-Time Search Techniques for Rapid Acquisition of Ultra-Wideband Signals," International Workshop on UWB Systems, Jun. 2003. 5 pages total, Jun. 2003.

M. Win, et al., "Ultra-Wide Bandwidth Time-Hopping Spread-Spectrum Impulse Radio for Wireless Multiple-Access Communications," IEEE Transaction on Communications, vol. 48, pp. 679-691, Apr. 2000.

Sandeep R. Aedudodla et al., "Timing Acquisistion in Ultra-Wideband Communication Systems," IEEE Transactions on Vehicular Technology, vol. 54, No. 5, pp. 1570-1583, Sep. 2005.

| INTEGER BEFORE BIT REVERSAL | BIT EXPRESSION BEFORE BIT REVERSAL | BIT EXPRESSION AFTER BIT REVERSAL | INTEGER AFTER BIT REVERSAL |
|---|---|---|---|
| 0 | 0000 | 0000 | 0 |
| 1 | 0001 | 1000 | 8 |
| 2 | 0010 | 0100 | 4 |
| 3 | 0011 | 1100 | 12 |
| 4 | 0100 | 0010 | 2 |
| 5 | 0101 | 1010 | 10 |
| 6 | 0110 | 0110 | 6 |
| 7 | 0111 | 1110 | 14 |
| 8 | 1000 | 0001 | 1 |
| 9 | 1001 | 1001 | 9 |
| 10 | 1010 | 0101 | 5 |
| 11 | 1011 | 1101 | 13 |
| 12 | 1100 | 0011 | 3 |
| 13 | 1101 | 1011 | 11 |
| 14 | 1110 | 0111 | 7 |
| 15 | 1111 | 1111 | 15 |

NEW INTEGER SEQUENCE

ALSO SYNCHRONIZED WITH MULTIPATH POSITION
TIME →

TIME →

SYNCHRONIZATION ACQUIRING DEVICE AND SYNCHRONIZATION ACQUIRING METHOD

TECHNICAL FIELD

The present invention relates to a clock acquisition apparatus and clock acquisition method used in Impulse Radio (IR) communication systems.

BACKGROUND ART

Recent advances in a communication technology, such as the availability of high-speed switching semiconductor devices, have enabled the use of transmitting and receiving a sequence of very short-duration radio frequency (RF) pulses, where the pulse duration is typically less than a nanosecond. Such a communication technology is sometimes referred to as "impulse radio (IR)."

Using very short-duration RF pulses, the IR technology can provide signal transmission over an ultra wide frequency bandwidth. In the IR technology, transmission is performed using an extended wide frequency bandwidth. Therefore, the average power spectral densities, although depending on the pulse repetition frequency and pulse amplitude levels, are in a very low region, for example, of $10^{-11}$ watts per Hertz. This low power emission can minimize interference with other wired or wireless systems operating in the same frequency band. In addition, a wide bandwidth in IR technology provides many advantageous characteristics for short range communications, such as a very large communication capacity at short distances.

However, the same characteristics that give prominence to the IR technology also lead to design challenges. One challenge is clock acquisition. Due to very short pulse duration in the IR technology, the acquisition process should be fast enough to support the IR data communication in a short time to a degree not considerably reducing the communication capacity. Furthermore, since the IR communication uses various modulation schemes, the clock acquisition also should provide accurate clock acquisition for various modulation schemes.

The clock acquisition for the IR technology can be classified into series search, parallel search and hybrid search, based on the acquisition method.

A sliding window series search can require searching for the signal through a number of dwell intervals in time (for example, Patent Document 1 and Non-Patent Document 1). In sliding window series search, a received signal and template signal are correlated and integrated at a receiver, and the baseband output is compared with a predetermined threshold. If the baseband output is larger than or equal to the threshold, the clock acquisition is completed. If the baseband output is less than the threshold, the template signal will be shifted or delayed by a predetermined time slot. The shifted or delayed template signal will be used in the receiver to repeat the operation of correlation, integration and threshold comparison. The operation is repeated until either the baseband output is larger than or equal to the threshold or all the shifted or delayed template signals are tested.

Non-Patent Document 2 explains several modifications on the sliding window series search, for example, random permutation search and bit reversal search. According to the simulation results in Non-Patent Document 2, the bit reversal search has a faster acquisition time than the sliding window search. However, the basic structure for series search mainly includes a single correlator, an adder and a threshold comparator.

A parallel search uses a receiver which adopts a configuration with a plurality of branches. In parallel search, each branch of the receiver has a correlator and an adder to do the same operation as series search. All branches carry out the operation simultaneously, and the maximum baseband output among these branches is compared with a predetermined threshold for signal acquisition.

Hybrid search works as a combination of series search and parallel search (for example, Non-Patent Document 3).

Patent Document 1: Japanese Patent Application Laid-Open No. HEI 6-74237

Non-Patent Document 1: "Rapid acquisition for ultra-wideband localizers", Robert Fleming, Cherie Kushner, Gary Roberts, Uday Nandiwada, IEEE UWBST2002, May 2002

Non-Patent Document 2: "Rapid acquisition of ultra-wideband signals in the dense multipath channel", Eric A. Homier, Robert A. Scholtz, IEEE UWBST2002, May 2002

Non-Patent Document 3: "Hybrid fixed-dwell-time search techniques for rapid acquisition of ultra-wideband signals", Eric A. Homier, Robert A. Scholtz, International Workshop on UWB Systems, June 2003 Non-Patent Document 4: "Ultrawide bandwidth Time-Hopping Spread Spectrum Impulse Radio for wireless multiple-access communications", M. Z. Win, R. A. Scholtz, IEEE Transaction on Communications, vol. 48, pp. 679-691, April 2000

DISCLOSURE OF INVENTION

Problems to be Solved by the Invention

However, the above-described three acquisition methods have their specific problems respectively. Due to the fine time resolution of the IR technology, the main problem of the sliding window series search is its long acquisition time. This is unacceptable in many time-constrained applications. Although the parallel search can give a faster acquisition time compared to the series search, it leads to a more complicated hardware implementation and increases hardware cost. A hybrid search is just a combination of series and parallel searches, which cannot effectively solve the intrinsic problems such as a long acquisition time and complicated receiver configuration.

It is therefore an object of the present invention to provide a clock acquisition apparatus and a clock acquisition method capable of realizing fast acquisition comparable to a parallel search with a simple configuration similar to that of a series search.

Means for Solving the Problem

The clock acquisition apparatus of the present invention is a clock acquisition apparatus that performs clock acquisition for an impulse radio communication, including: an acquisition section that acquires a plurality of convolved template signals, each formed by convolving a plurality of template signals; a preliminary detection section that detects a preliminary correlation match between one convolved template signal acquired by the acquisition section and a received signal, and, when the preliminary correlation match between the one convolved template signal and the received signal is not detected, substitutes another convolved template signal acquired by the acquisition section for the one convolved template signal and then detects the preliminary correlation match; and a final detection section that detects, when the preliminary detection section detects the preliminary correlation match, a final correlation match between any one template signal out of the plurality of template signals and the received signal.

The clock acquisition method of the present invention is a clock acquisition method for performing clock acquisition for an impulse radio communication, including the steps of: acquiring one convolved template signal formed by convolving a plurality of template signals; detecting a preliminary correlation match between the one convolved template signal and a received signal; acquiring, when the preliminary correlation match between the one convolved template signal and the received signal is not detected, another convolved template signal formed by convolving the plurality of template signals; detecting the preliminary correlation match after substituting the another convolved template signal for the one convolved template signal; and detecting, when the preliminary correlation match is detected, a final correlation match between any one template signal out of the plurality of template signals and the received signal.

Advantageous Effect of the Invention

According to the present invention, it is possible to realize fast clock acquisition comparable to a parallel search with a simple configuration similar to that of a series search.

BEST MODE FOR CARRYING OUT THE INVENTION

Hereinafter, embodiments of the present invention will be described in detail with reference to the accompanying drawings.

Embodiment 1

Figure 1:
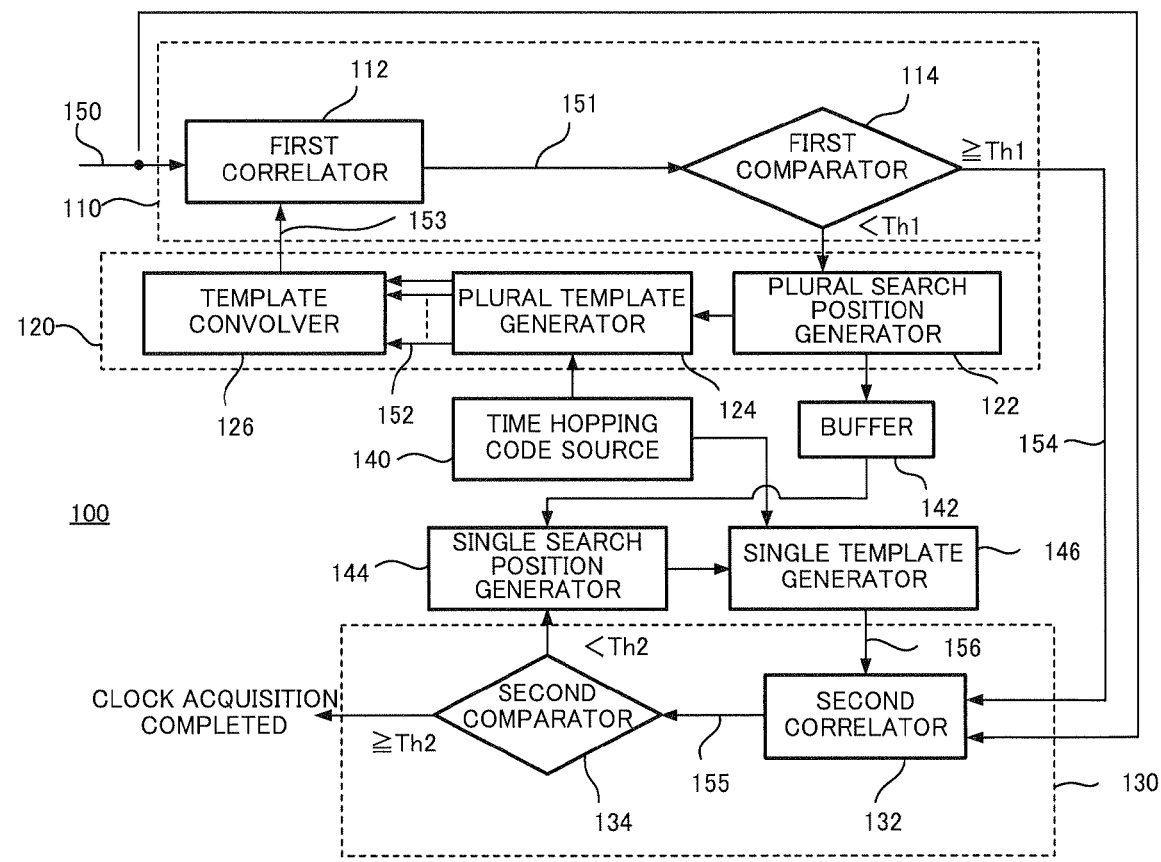
FIG. 1 is a block diagram showing the configuration of a clock acquisition apparatus according to Embodiment 1 of the present invention.

FIG. 1 is a block diagram showing the configuration of a clock acquisition apparatus according to Embodiment 1 of the present invention. Clock acquisition apparatus 100 can be used provided to a terminal apparatus for an IR communication or the like. Clock acquisition apparatus 100 is provided with first correlation detection section 110, convolved template acquisition section 120, second correlation detection section 130, time hopping code source 140, buffer 142, single search position generator 144 and single template generator 146.

First correlation detection section 110 as a preliminary correlation detection section has first correlator 112 and first comparator 114. First correlation detection section 110 detects a preliminary correlation match between a given convolved template signal and a received signal. When no preliminary correlation match between the convolved template signal and the received signal is detected, first correlation detection section 110 substitutes another convolved template signal for the convolved template signal and then detects a preliminary correlation match.

Convolved template acquisition section 120 as an acquisition section includes plural search position generator 122, plural template generator 124 and template convolver 126. Convolved template acquisition section 120 acquires a plurality of convolved template signals formed by convolving a plurality of template signals.

Second correlation detection section 130 as a final correlation detection section includes second correlator 132 and second comparator 134. When a preliminary correlation match is detected, second correlation detection section 130 detects a final correlation match between any one template signal of the plurality of template signals forming the convolved template signal and a received signal.

Next, a series of clock acquisition processing executed at clock acquisition apparatus 100 which has the above-described configuration will be explained. The series of clock acquisition processing includes two stages of clock acquisition processing.

First, the first stage of the clock acquisition processing, that is, detection of a preliminary correlation match is performed.

The first stage of the clock acquisition processing starts when received signal 150 is inputted to first correlator 112 as shown in FIG. 1.

Received signal 150 is a signal received at the reception section (not shown) of a terminal apparatus provided with clock acquisition apparatus 100 and includes a signal transmitted from a communicating party apparatus of the terminal apparatus. The transmitted signal is influenced by the characteristics of the transmission channel (for example, Gaussian noise, channel delay or multipath fading), and then reaches the terminal apparatus as received signal 150.

Furthermore, the transmitted signal is a signal subjected to modulation processing according to a predetermined scheme. For an IR communication, various modulation schemes can be used such as pulse polarity modulation, pulse amplitude modulation (PAM), phase modulation, frequency modulation and pulse position modulation (PPM) (may also be referred to as "time shift modulation" or "pulse interval modulation"), or a multivalue version of these modulation schemes. In this embodiment, a known signal subjected to PPM and a template signal are used as an example. However, the modulation scheme to which the present invention is applicable is not limited to PPM.

Figure 2:
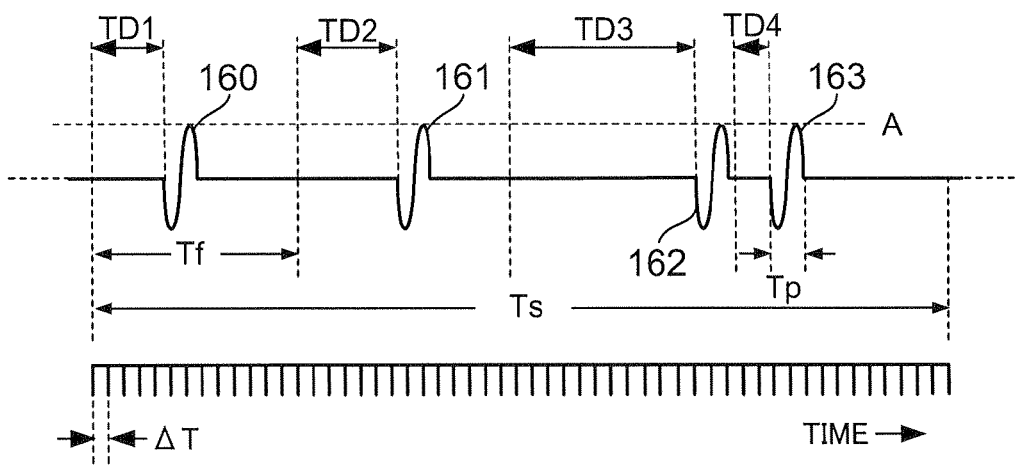
FIG. 2 illustrates an example of a signal subjected to pulse position modulation.

FIG. 2 illustrates a signal subjected to PPM. This signal is a signal for which time hopping codes are introduced after PPM for the purpose of supporting transmission by many users simultaneously. Furthermore, it is a signal formed with a pulse sequence of a typical low duty cycle.

A time domain is divided into many subframes. One pulse (four pulses 160, 161, 162 and 163 are shown in FIG. 2) exists in each subframe, and information data is stored at a time position of each pulse. Nf subframes (Nf is a natural number) form one symbol frame. A duration of each subframe is assumed to be Tf. Furthermore, each symbol frame has duration Ts (Ts=Nf×Tf). Each pulse 160 to 163 has fixed amplitude A and pulse width Tp. Generally, pulse width Tp is less than 1 nanosecond.

The shape of pulses 160 to 163 is important from the standpoint of design. This embodiment explains pulses 160 to 163 having a Gaussian monocycle shape as an example, but usable pulse shapes are not limited to the above-described one.

The time positions (time delays TD1, TD2, TD3 and TD4) of pulses 160 to 163 are determined not only by PPM but also by time hopping codes (for example, Non-Patent Document 4). The pseudo-random TH codes can set the time delay of each pulse, such as TD1, TD2, TD3 and TD4, to be randomized to reduce the discrete frequency component in the spectrum.

Furthermore, the time resolution of clock acquisition is defined as time interval $\Delta T$. When it is assumed that $Tp=Nt \times \Delta T$ and $Tf=Np \times Tp$ (Nt and Np are natural numbers), the total number N of pulse dwell intervals in one symbol frame is calculated as $N=Nt \times Np \times Nf$.

In addition to received signal 150, a convolved template signal is inputted to first correlator 112.

Here, the process of acquiring a convolved template signal will be explained.

First, plural search position generator 122 will select M (M is an integer equal to or greater than 2) time positions to create M template signals. The details of selection of M time positions will be explained later. The selected M time positions are stored in buffer 142 and reported to plural template generator 124.

Plural template generator 124 generates M template signals 152 according to the M time positions and the time hopping code peculiar to the user inputted from time hopping code source 140. The generated M template signals 152 are inputted to template convolver 126.

Each template signal 152 is a signal subjected to the same modulation (PPM in this embodiment) as the signal transmitted from the communicating party apparatus. M template signals 152 have mutually identical symbol frame durations, mutually different start time positions and mutually different end time positions. The time difference in the start time position (and end time position) between arbitrary two template signals out of M template signals 152 is, for example, an integer multiple of pulse width Tp.

Template convolver 126 convolves M template signals 152. In this way, single convolved template signal 153 is generated. The details of the convolution of template signals 152 will be explained later.

First correlator 112 multiplies received signal 150 by convolved template signal 153 and integrates the multiplication result. Baseband output signal 151 obtained in this way is inputted to first comparator 114. A series of processing at first correlator 112 will be sometimes referred to as a "preliminary correlation calculation" in the following explanations.

First comparator 114 compares baseband output signal 151 with predetermined threshold Th1. When baseband output signal 151 is greater than threshold Th1 or equal to threshold Th1, that is, when a preliminary correlation match is detected, first comparator 114 transmits signal 154 to start clock acquisition in a second stage to second correlator 132. On the other hand, when baseband output signal 151 which is outputted from the first correlator is smaller than threshold Th1, that is, when no preliminary correlation match is detected, all the M previously selected time positions are adjusted by plural search position generator 122. More specifically, M time positions which belong to a group different from the time positions already selected are newly selected to newly create a template signal. The newly selected M time positions are reported to plural template generator 124. Buffer 142 is updated with the M newly selected time positions.

As far as baseband output signal 151 is smaller than threshold Th1, the adjustment of M time positions, generation of M template signals 152, convolution of M template signals 152, preliminary correlation calculation and comparison between baseband output signal 153 and threshold Th1 are repeatedly executed. However, when baseband output signal 153 is still smaller than threshold Th1 even if all possible combinations about the M time positions are used, clock acquisition processing is given up or clock acquisition processing is done over from the beginning.

The clock acquisition processing in the second stage, in other words, detection of a final correlation match starts when signal 154 is inputted to second correlator 132.

Received signal 150 and template signal 156 are inputted to second correlator 132 in addition to signal 154.

Here, the process of acquiring a template signal inputted to second correlator 132 will be explained.

First, M time positions when a preliminary correlation match is detected are inputted to single search position generator 144 from buffer 142. Single search position generator 144 selects one out of the M time positions to create a template signal and reports the time position to single template generator 146. Single template generator 146 generates single template signal 156 according to the reported single time position and the time hopping code peculiar to the user inputted from time hopping code source 140. Template signal 156 generated here is identical to M template signals 152 generated at the time of a preliminary correlation match.

Second correlator 132 multiplies received signal 150 by template signal 156 and integrates the multiplication result.

Baseband output signal 155 obtained in this way is inputted to second comparator 134. A series of processing at second correlator 134 will be sometimes referred to as a "final correlation calculation" in the following explanations.

Second comparator 134 compares baseband output signal 155 outputted from second correlator 132 with predetermined threshold Th2 (Th2<Th1). When baseband output signal 155 is greater than threshold Th2 or equal to threshold Th2, that is, when a final correlation match is detected, clock acquisition is considered to have been completed successfully, and the series of clock acquisition processing is completed.

On the other hand, when baseband output signal 155 is less than threshold Th2, that is, when no final correlation match is detected, one previously selected time position for creating a template signal is reselected by single search position generator 144. This reselection is accomplished by selecting one time position other than the already selected time positions out of the M time positions. The reselected time position is reported to single template generator 146.

As far as baseband output signal 155 is less than threshold Th2, reselection of one time position, generation of single template signal 156, final correlation calculation and comparison between baseband output signal 155 and threshold Th2 are repeatedly executed. However, even if all the M time positions are used, when baseband output signal 155 is still less than threshold Th2, the clock acquisition processing in the first stage (correlation processing by the first correlator) is resumed at M time positions which are different from the one when the preceding preliminary correlation match was detected.

Next, a desirable method of convolving template signal 152 which is executed at template convolver 126 will be explained. Here, a case where two template signals are convolved will be explained as an example.

Figure 3A:
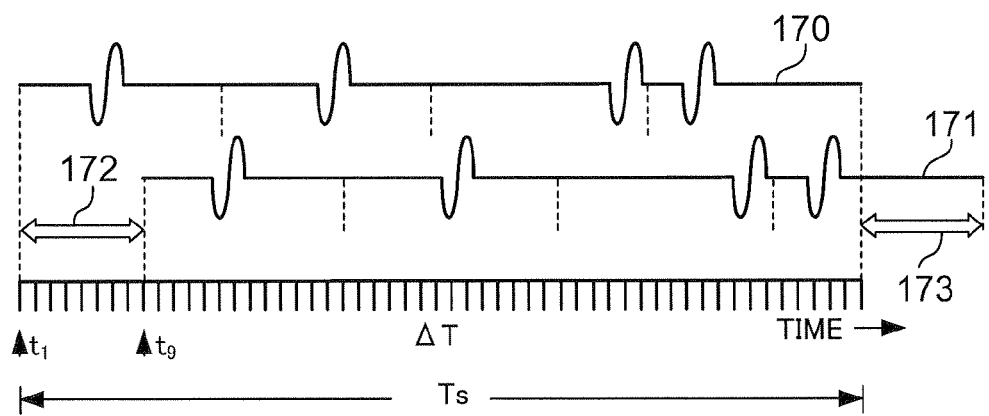
FIG. 3 illustrates a method of convolving a template signal according to Embodiment 1.
Figure 3B:
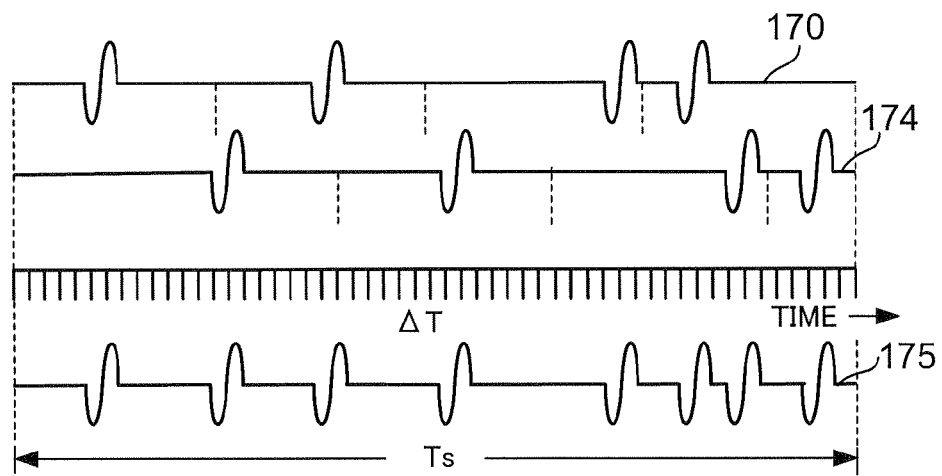

As shown in FIG. 3(a), template signals 170 and 171 have start time positions $t_1$ and $t_9$ respectively. Therefore, the time difference between template signals 170 and 171 is ΔT×8. In this case, as shown in FIG. 3(b), the signal of delay section 173 of template signal 171—the signal corresponding to the part of template signal 171 located behind the end time position of template signal 170—is moved to section 172 immediately before the start time position of template signal 171. Such processing will be sometimes referred to as a "cycle shift" in the following explanations.

By executing cycle shift on template signal 171, template signal 174 having a start time position and an end time position which are identical to those of template signal 170 is obtained. Template signals 170 and 174 are convolved, and, as a result, convolved template signal 175 is generated.

Template convolver 126 obtains a plurality of template signals which always have mutually identical start time positions and end time positions and convolves the template signals, so that it is possible to always keep symbol frame duration Ts of the generated convolved template signal constant and to a minimum value.

When any one of time positions $t_1$ and $t_9$ shown in FIG. 3(a) is equal to arrival timing $t_0$ of received signal 150, baseband output signal 151 obtained as a result of the preliminary correlation calculation using convolved template signal 175 and received signal 150 becomes greater than threshold Th1 or equal to threshold Th1. In this case, arrival timing $t_0$ of received signal 150 can be known by carrying out final correlation calculation using template signal 170 or template signal 171 and received signal 150. However, when both time positions $t_1$ and $t_9$ are different from arrival timing $t_0$ of received signal 150, baseband output signal 151 becomes smaller than threshold Th1. In this case, all of the plurality of template signals 170 and 171 are excluded, and a plurality of other template signals are used simultaneously. Therefore, the clock acquisition processing of this embodiment is comparable in speed to clock acquisition in a conventional parallel search while adopting a simple configuration based on the configuration of a conventional series search. Even when any one of time positions $t_1$ and $t_g$ is identical to arrival timing $t_0$ of received signal 150, when noise power added to the received signal and multipath signal power are large, it goes without saying that the correlation result may not exceed threshold Th1 and that no correlation may be detected.

Here, a plurality of template signals (in other words, a plurality of time positions) which are convolved to form a convolved template signal must be systematically selected. The method of selecting a plurality of template signals, that is, the method of selecting time positions at plural search position generator 122 includes several modes.

Figure 4:
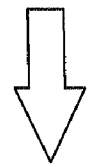
FIG. 4 illustrates an example of a method of selecting a time position using bit reversal according to Embodiment 1.

A first preferred mode is to use bit reversal. For example, the case will be described as an example where the number of pulse dwell intervals in one subframe is 16 ($2^4$ pulse dwell intervals). As shown in FIG. 4, 16 integers 0, 1, 2, 3 ..., 14, 15 can be expressed in binary bits as 0000, 0001, 0010, 0011, ..., 1110, 1111, respectively. When the bit sequence is reversed, 16 binary bit expressions are 0000, 1000, 0100, 1100, ..., 0111, 1111 in that order. When the binary bit expressions after the bit reversal are converted to integers, 16 integers are 0, 8, 4, 12, ..., 7, 15 in that order.

According to a new integer sequence obtained in this way, a plurality of time positions for a plurality of template signals can be selected. When, for example, two time positions must be selected, $[t_1, t_9]$, $[t_5, t_{13}]$, ..., $[t_8, t_{16}]$ can be sequentially selected. When a plurality of selected template signals are convolved, this can prevent the plurality of template signals from interfering with or canceling out each other.

Figure 5A:
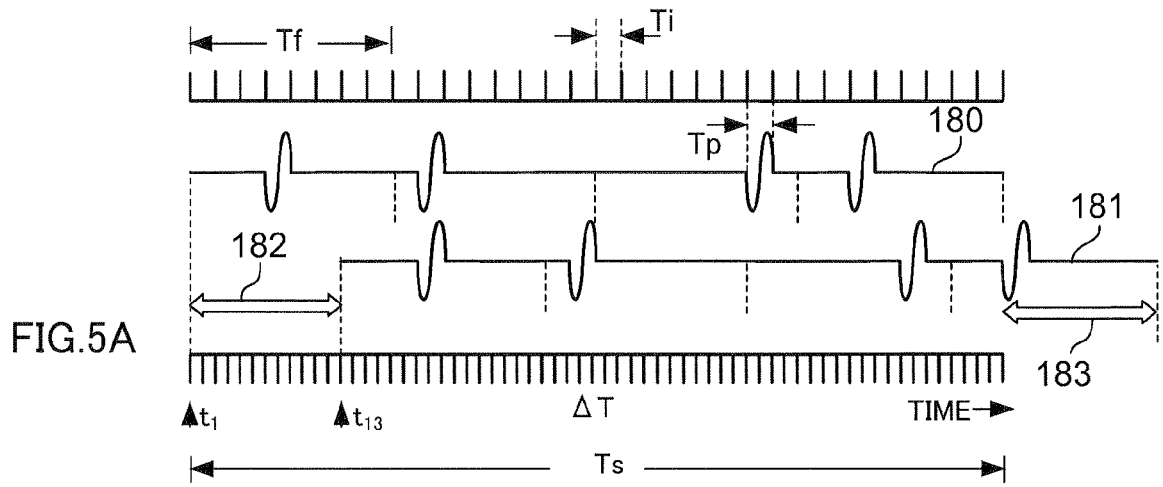
FIG. 5 illustrates another method of convolving a template signal according to Embodiment 1.
Figure 5B:
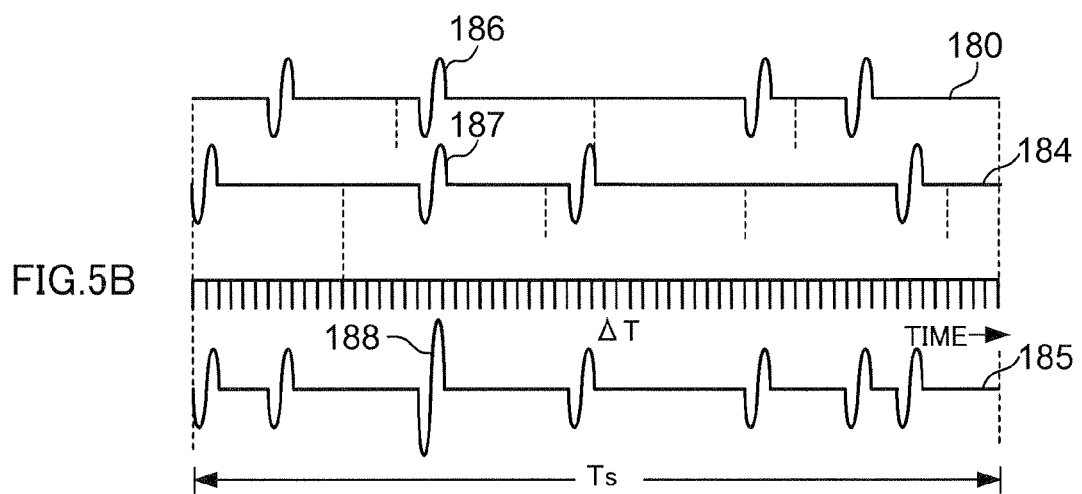

A second preferred mode is to set each time difference between a plurality of selected template signals to an integer multiple of pulse width Tp. In this case, when a plurality of template signals are convolved, pulses in any two template signals may be convolved so as to strengthen each other depending on the combination of template signals. FIG. 5(a) and FIG. 5(b) illustrate this situation.

As shown in FIG. 5(a), template signals 180 and 181 have start time positions $t_1$ and $t_{13}$ respectively. Pulse section Ti is equal to pulse width Tp. As shown in FIG. 5(b), a signal of delay section 183 of template signal 181—the signal corresponding to the part of template signal 181 located behind the end time position of template signal 180—is moved to section 182 immediately before the start time position of template signal 181.

By executing a cycle shift on template signal 181, template signal 184 having a start time position and an end time position which are identical to those of template signal 180 is obtained. Template signals 180 and 184 are then convolved, and as a result, convolved template signal 185 is generated.

When template signals 180 and 184 are convolved, since pulse section Ti is set to be equal to pulse width Tp, their respective pulses 186 and 187 are convolved so as to mutually strengthen each other. Convolved pulse 188 has the same shape as other pulses but has amplitude twice that of the other pulses. Therefore, when pulses 186 and 187 are convolved so as to strengthen each other, the pulses of template signals 180 and 184 never cancel out each other.

When mutual cancellation between pulses occurs, the possibility of arrival timing $t_0$ of received signal 150 being missed increases. Therefore, mutual cancellation between pulses is avoided by setting each time difference to an integer multiple of pulse width Tp and it is thereby possible to realize reliable clock acquisition in a short time.

Furthermore, by allowing overlapping of pulses 186 and 187 generated when a plurality of template signals 180 and 184 are convolved, it is possible to multiplex more template signals and further shorten the clock acquisition processing.

In this way, according to this embodiment, it is possible to achieve a fast clock acquisition speed comparable to that of a conventional parallel search with a simple configuration based on the configuration of a conventional series search.

Clock acquisition apparatus 100 of this embodiment is based on the configuration of only a series search but may also introduce the configuration of a parallel search to clock acquisition apparatus 100. For example, it is also possible to adopt a configuration using a plurality of first correlators 112 in the first stage and a plurality of second correlators 132 in the second stage in parallel respectively. In this way, it is possible to realize further speed enhancement of clock acquisition.

Furthermore, in the above explanations, the case has been described where signals including a high frequency component are used for the template signal and the received signal. However, the template signal and the received signal are not limited to the above-described ones. For example, it is possible to use a signal whose AC component is partially cut out through a diode or the like or whose AC component is cut out through an envelope detection whereby an AC signal is integrated by an integrator and further use a template signal according to such a received signal.

Figure 10:
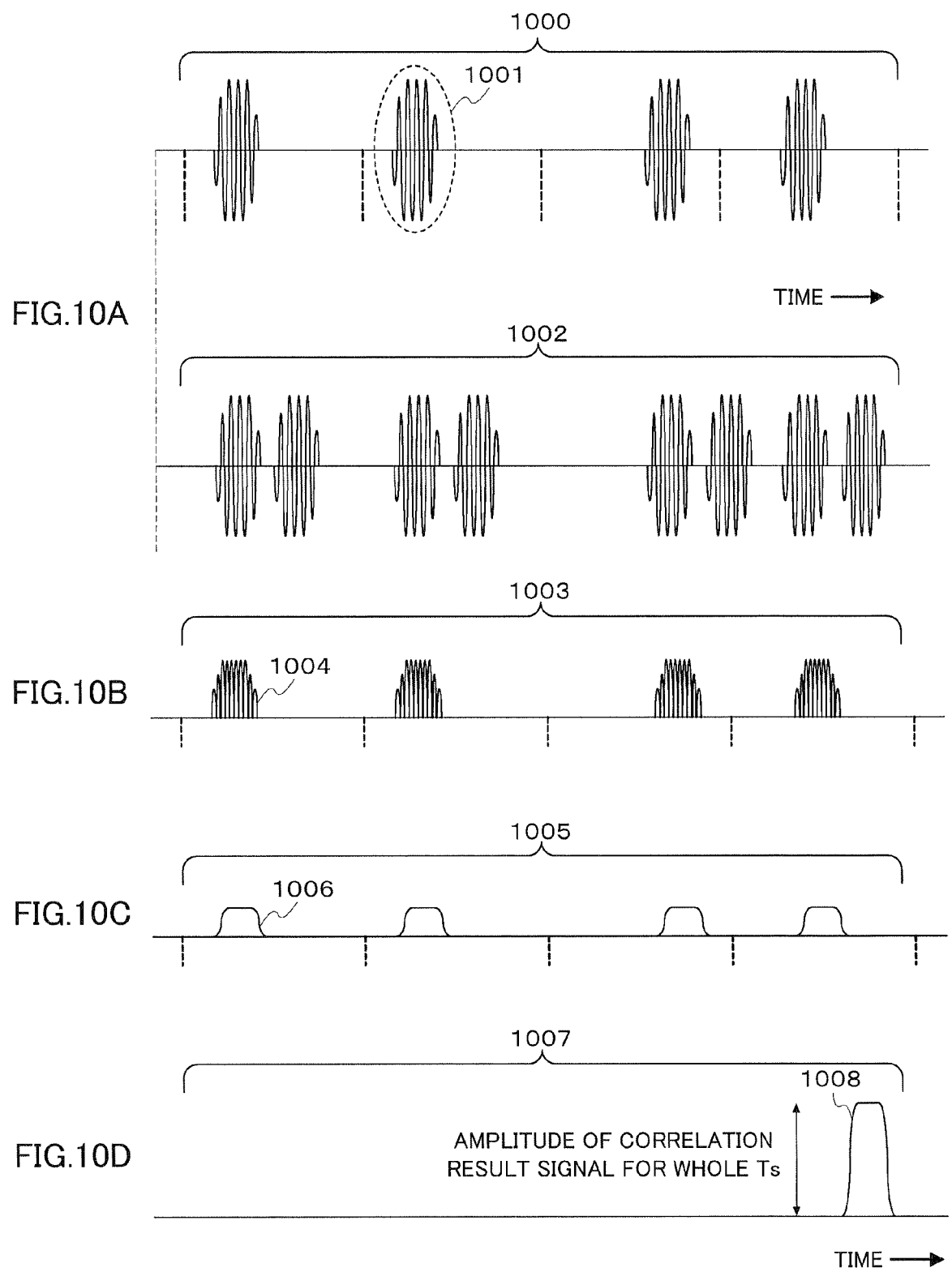
FIG. 10 illustrates correlation between a template signal having a signal shape different from that in FIG. 2 and FIG. 5 and a received signal.

FIG. 10 shows an example using a signal shape which is different from those of the template signal and the received signal in the above-described explanation. FIG. 10A shows template signal 1002 convolved on received signal 1000, and reference numeral 1001 is one pulse signal. As pulse signal 1001, for example, a signal having a frequency component in a given frequency band can be used, and specific frequencies may be a 24 GHz to 29 GHz band or 59 GHz to 66 GHz band. Reference numeral 1003 shown in FIG. 10B is a signal obtained by multiplying received signal 1000 by template signal 1002, and, when received signal 1000 and template signal 1002 are completely synchronized with each other, pulse 1004 includes only components with a positive polarity. Reference numeral 1005 in FIG. 10C is a signal obtained by smoothing pulse 1004 using a filter, and output signal 151 of first correlator 112 corresponds to this. Reference numeral 1006 is an individual pulse. Reference numeral 1007 in FIG. 10D is a signal obtained by processing above-described signal 1005 through, for example, a matched filter, that is, a signal which represents a correlation result in whole Ts, and 1008 is a correlation peak thereof. First comparator 114 detects whether or not the amplitude of this correlation peak 1008 exceeds a predetermined threshold and judges preliminary correlation.

Furthermore, in this embodiment, also it is possible to use a convolved template signal in which the start time difference of each template signal is identical. Such a convolved template signal can be generated, for example, by changing the time at which a convolved template signal is inputted to first correlator 112 using a variable delay circuit. Here, the delay time of the variable delay circuit can be arbitrarily set. By setting the delay time to a relatively short time, it is possible to prevent the correlation timing from being missed, and by setting the delay time to a relatively long time, it is possible to reduce the number of trials. Furthermore, the delay time can be set to be variable within a range of, for example, ⅕ to 1/20 of pulse width Tp.

Figure 18:
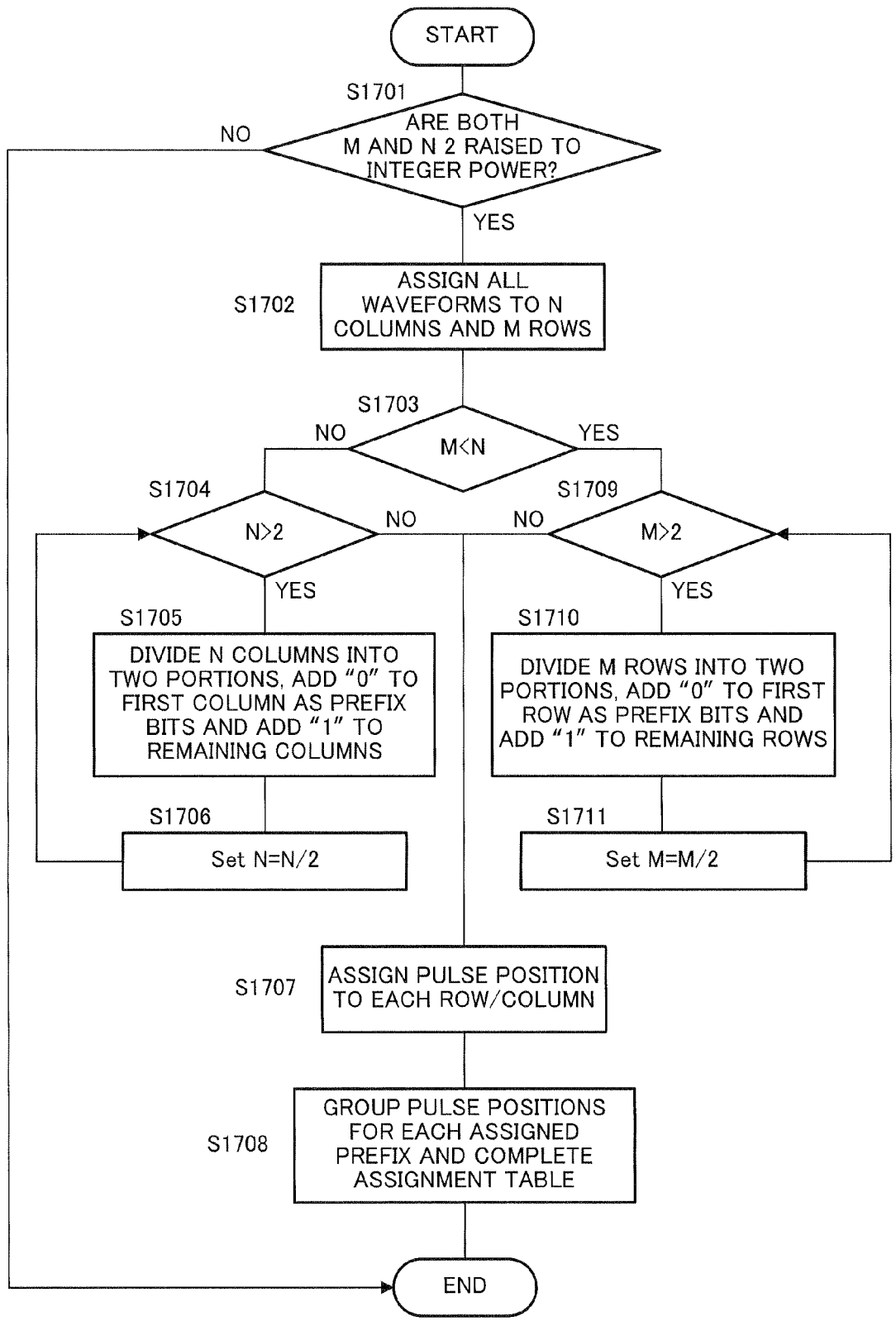
FIG. 18 is a flowchart illustrating a method of making a combination of each pulse position and pulse amplitude correspond to a bit sequence when PPM and PAM are used as a modulation scheme.

Furthermore, in the above explanations, the case has been described using the example shown in FIG. 4 as a bit sequence, but it is also possible to use other sequences so as to increase a Hamming distance and enhance an error correction effect. FIG. 18 shows an example of the method of determining a sequence.

The flow in FIG. 18 uses a modulation scheme which combines M-ary PPM and N-ary PAM. This will be explained sequentially. First, all pulse positions and amplitudes are assigned to a matrix with M rows and N columns, and it is confirmed whether or not both M and N are 2 raised to integer powers (S1701). When both M and N are 2 raised to integer powers (S1701: YES), all waveforms are assigned to N columns and M rows (S1702). Next, it is decided in which direction of column or row each data should be assigned. Here, it is judged which of M or N is greater or smaller (S1703) and the subsequent processing will be carried out based on whichever is the fewer. From here on, a case where N is selected (S1703: NO) will be explained. It is judged whether N is greater than 2 or not (S1704), and, when N is greater than 2 (S1704: YES), column N is divided into two portions, "0" is added to the first column, and "1" is added to the remaining column as prefixes (S1705). After that, N is divided by 2 (S1706), and the division is continued until updated N falls to or below 2. When N falls to or below 2 (S1704: NO), a pulse position is assigned to each row/column (S1707). Finally, pulse positions are grouped for each assigned prefix, and an assignment table is completed (S1708). As a result of the judgment in S1703, when M is less than N (S1703: YES), the processes in S1709, S1710 and S1711 are carried out based on M.

Figure 19A:
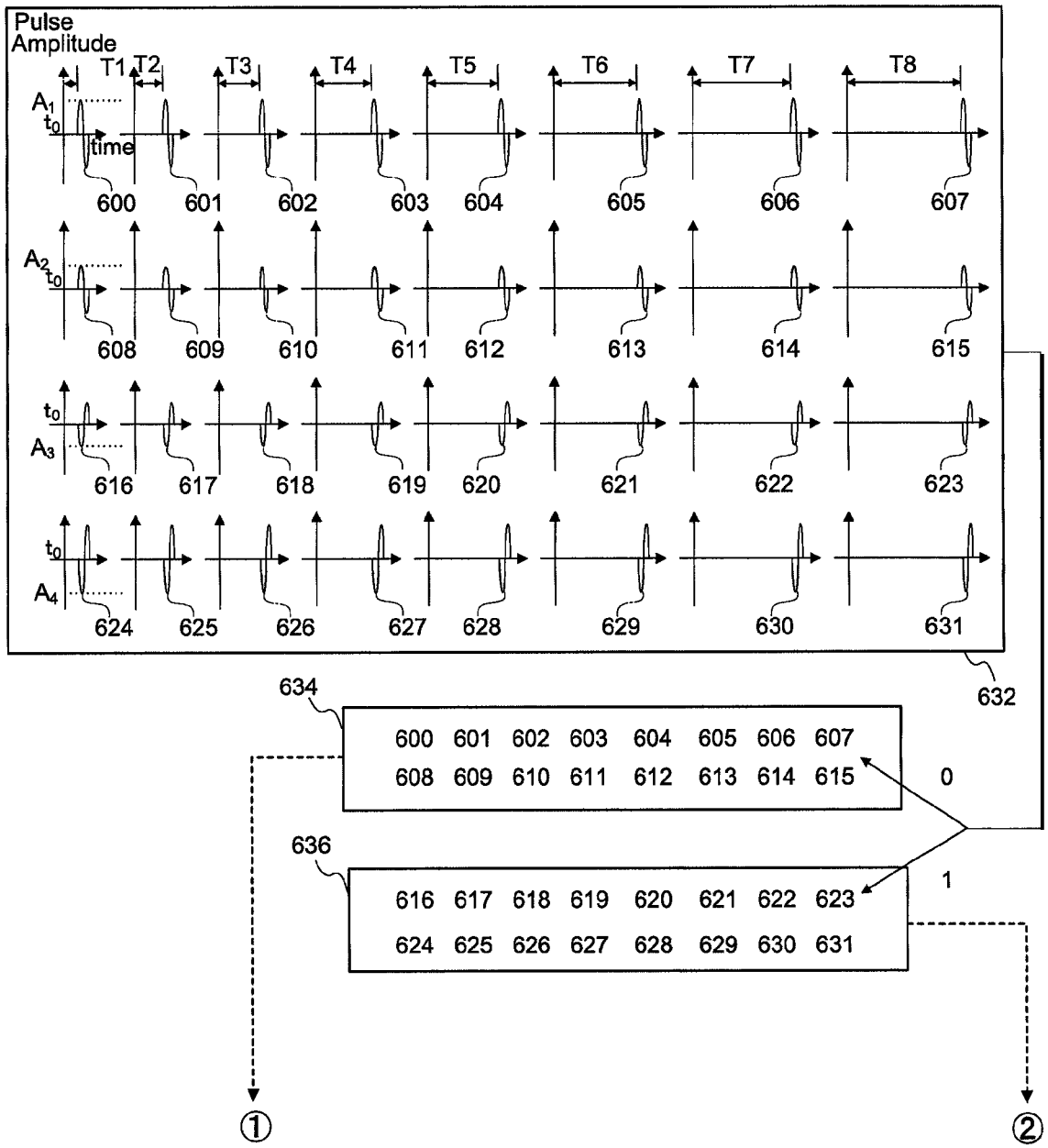
FIG. 19A illustrates a method of making a combination of each pulse position and pulse amplitude correspond to the bit sequence when PPM and PAM are used as modulation schemes.
Figure 19B:
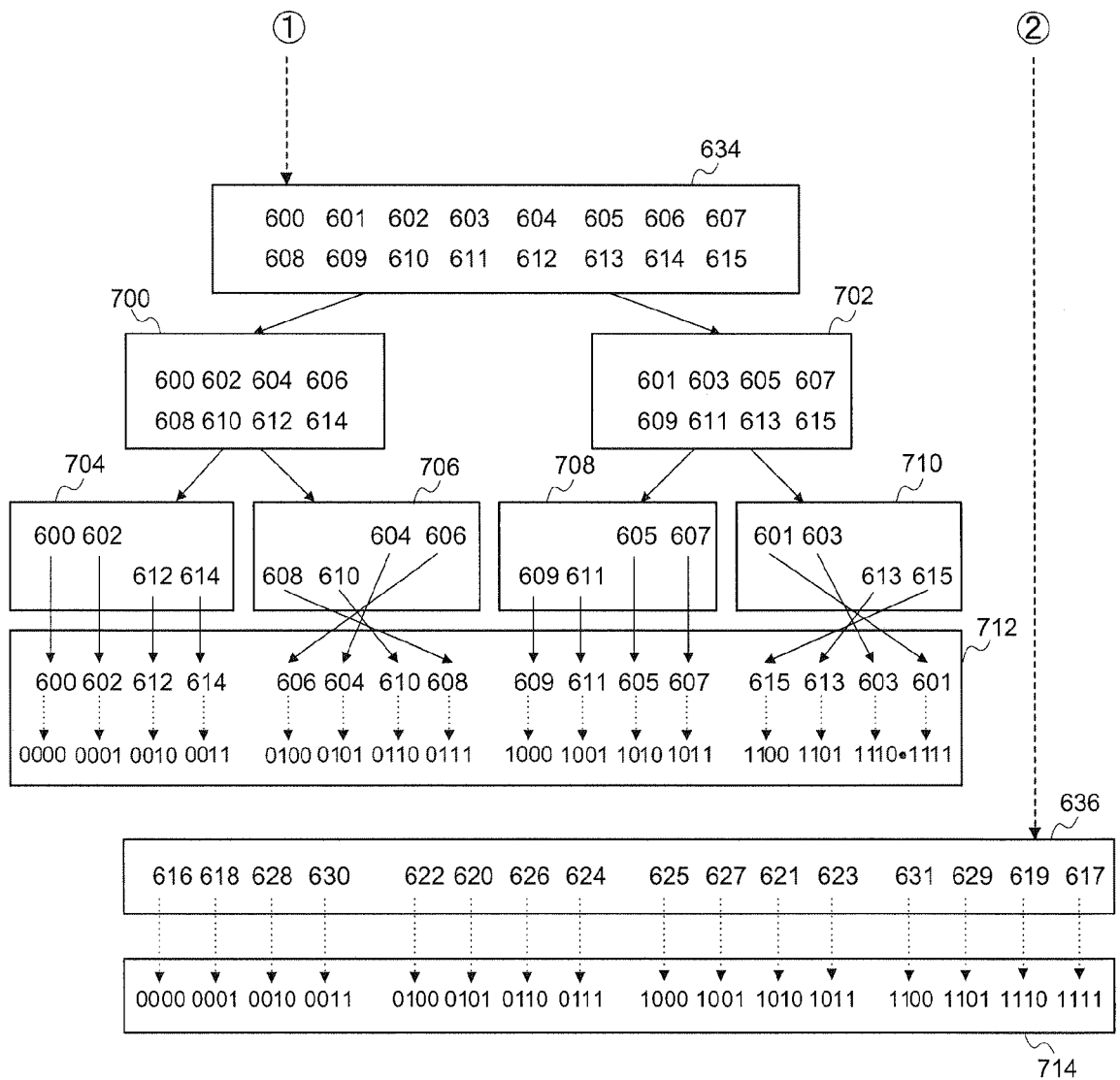
FIG. 19B is a diagram that follows FIG. 19A.

FIG. 19 shows a case where 8-ary PPM and 4-ary PAM are used. Reference numeral 632 shows a state in which all pulses are assigned to a matrix where a total of 32 pulses of different conditions exist; eight pulses at different positions by 8-ary PPM and two amplitudes and two phase states by 4-ary PAM. Reference numerals 600 to 631 are pulses of block 632, and prefix bits "0" are assigned to pulses 600 to 615, and prefix bits "1" are assigned to pulses 616 to 631 so that a Hamming distance between neighboring pulses on the vertical axis—N-ary—increases. This state corresponds to block 634 and block 636. Here, since N=2, the assignment on N-ary is completed.

Next, pulses 600 to 615 of block 634 will be explained. Here, pulses are assigned so that a Hamming distance between neighboring pulses on the horizontal axis—M-ary—increases. For example, since a Hamming distance between pulse positions 600 and 601 is small, pulses 600, 602, . . . , 612, 614 are assigned to block 700, and pulses 601, 603, . . . , 613, 615 are assigned to block 702.

Next, since M=4, pulses are assigned so that a Hamming distance between neighboring pulses increases. For example, 600, 602, 612 and 614 are assigned to block 704, and pulses 604, 606, 608 and 610 are assigned to block 706.

Next, since N=2, M=2, bits are assigned to pulses in each block. Considering that Hamming distances between all neighboring pulses increase and a case where 8-ary PPM and 4-ary PAM are used, as shown in block 712, bits are assigned in order of pulses 606, 604, 610 and 608 in block 706. Block 636 is processed in the same way, and bits in block 714 are assigned to pulses in block 636.

As described above, given prefix bit "0" and assigned bit "0000", "00000" is assigned to pulse 600 and "11100" is assigned to pulse 631. In this way, when there is a pulse decision error, it is easy to correct data through error correction because data error locations are bunched together.

In this way, it is possible to create a mapping table in which bit sequences having large Hamming distances are mapped to pulses having similar positions and amplitudes. That is, an impulse radio transmission apparatus that transmits data using the above mapping table is provided with a mapping control section that changes a mapping table according to the number of pulse mapping positions (the number of combinations of pulse positions and pulse amplitudes here), a data division section that divides data according to the number of pulse mappings and a mapping execution section that executes mapping using a data sequence outputted by the data division section (this data sequence has the number of bits indicating the number of pulse mappings) and the mapping table. Furthermore, the impulse radio reception apparatus on the receiving side is provided with a mapping control section that changes a mapping table according to the number of pulse mapping positions (that is, the number of combinations of positions and amplitudes here), a data division section that divides received data according to the number of pulse mappings and a mapping execution section that executes mapping using a data sequence outputted by the data division section (this data sequence has the number of bits indicating the number of pulse mappings) and the mapping table.

By applying the concept when creating this mapping table to plural search position generator 122, it is possible to realize plural search position generator 122 which selects a template signal whose bit sequence is determined according to the pulse positions and the pulse amplitudes. Moreover, the template is a signal whose bit sequence is determined based on one of the pulse position and the pulse amplitude and then determined based on the other.

Figure 20:
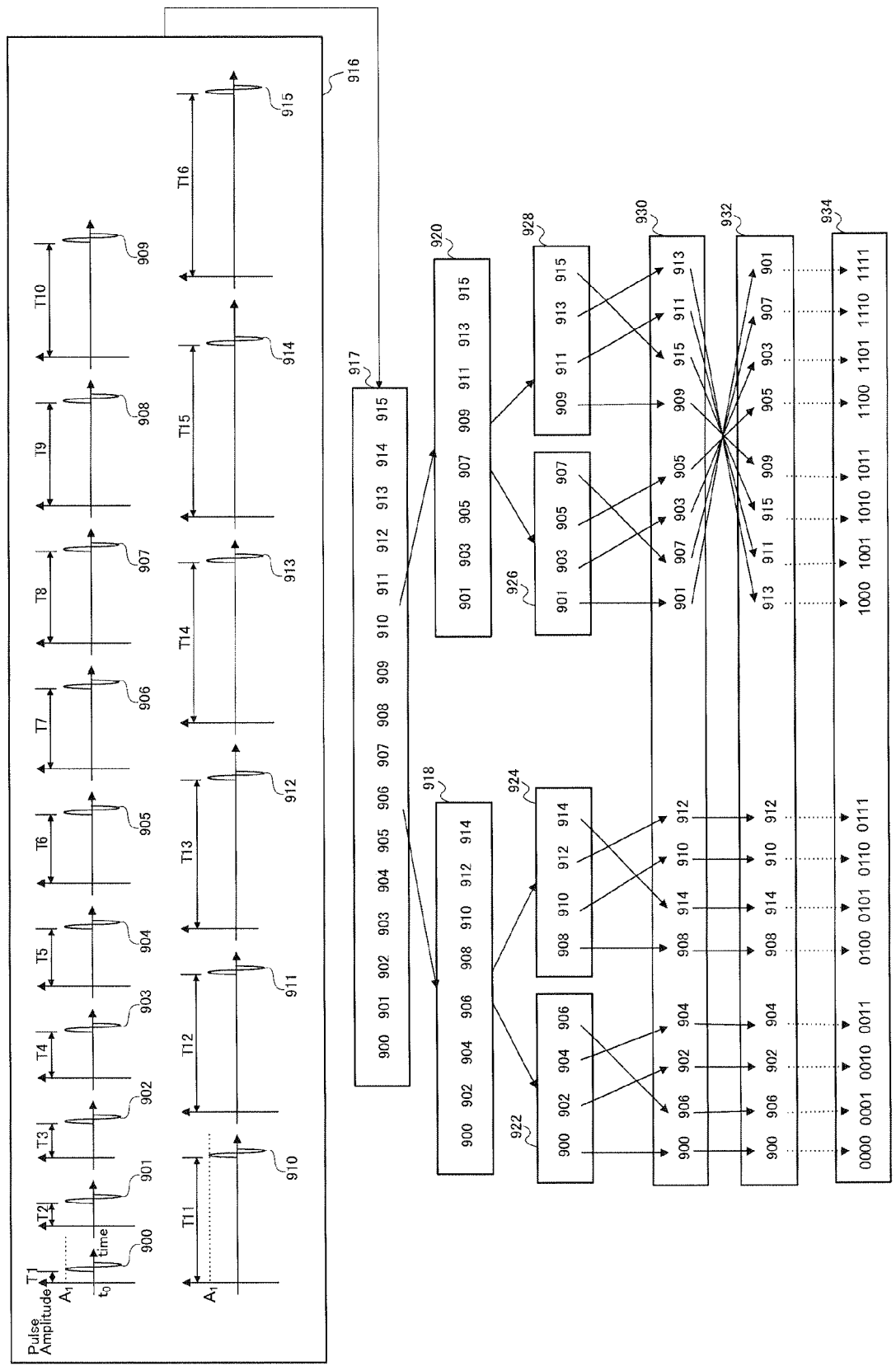
FIG. 20 illustrates a method of making each pulse position correspond to the bit sequence when 16-PPM is used as a modulation scheme.

Likewise, FIG. 20 shows a case realized using 16-PPM. Block 916 includes a total of 16 pulses with different conditions having 16 different positions by 16-ary PPM with all pulses assigned to the matrix. Reference numerals 900 to 915 are pulses in block 916. Block 917 expresses respective pulses using only their numbers.

Next, pulses are assigned so that Hamming distances between pulses increase. The results are block 918 and block 920. Each block is further divided into two blocks and blocks 922, 924, 926 and 928 are obtained as a result. Bits are then assigned to pulses in each block considering that Hamming distances between all neighboring pulses increase. This flow is shown in blocks 930, 932 and 934. Similar effects can be obtained in this case, too, by making 900 and 901 for which pulse decision errors are likely to occur correspond to "0000" and "1111" respectively. Without fixing the multivalue due to differences in the pulse position or amplitude, it is also possible to increase or decrease the multivalue by detecting, for example, changes in an error rate and reception power. A change in the error rate may be detected by providing a detection section such as a counter for the demodulation section, and a change in reception power may be generally detected using, for example, an RSSI signal.

In the above explanations, a carrier frequency of a signal used for a communication or a multi access method when a plurality of terminals are used are not described, but these can be implemented using a common method such as TDMA and FDMA.

According to, for example, TDMA, when terminals using an identical modulation scheme carry out a plurality of communications using an identical carrier frequency band, for example, 60 GHz band, it is a general practice that a data sequence for synchronization and authentication is used at the start of the communication and each terminal identifies this data sequence to avoid collision between communications.

On the other hand, even when a data sequence for synchronization, authentication and demodulation is transmitted with signals in different carrier frequency bands, by using a plurality of template signals as signals in different carrier frequency bands corresponding thereto, it is possible to carry out synchronization, authentication and demodulation. As the signals in different carrier frequency bands, it is possible to combine a microwave signal using, for example, a 3 GHz to 10 GHz band with any one of signals using a 25 GHz band and a 60 GHz band. As the combination method, for example, a microwave signal may be used during standby, when a communication distance is large or in an environment in which communication apparatuses are not mutually visible. A 60 GHz band may be used after a communication is established or when apparatuses are located close to each other or in an environment in which apparatuses are mutually visible.

Furthermore, even if there is a mixture of communication systems based on different modulation schemes, signals can be synchronized, authenticated and demodulated using not only the above carrier frequency bands but also using a plurality of template signals as signals based on different modulation schemes. As the signals based on different modulation schemes, it is possible to combine, for example, an impulse communication subjected to amplitude, phase or position modulation with any one of directly modulated UWB communication and OFDM-modulated UWB communication.

Furthermore, although in the above explanations, the frequency with which a plurality of template signals are convolved has not been described, template signals may be convolved with an identical frequency or with different frequencies. Furthermore, the frequency of occurrence may also be changed according to the communication state. As the method of changing the frequency of occurrence, upon reception of signals requiring phase synchronization such as BPSK, by increasing the frequency of occurrence of template signals for which rough synchronization can be established using an envelope and increasing the frequency of occurrence of template signals having phase information for which phase synchronization can be established after synchronization in an envelope unit exceeds a predetermined value, it is possible to shorten synchronization and realize high accuracy. In the same way, the frequency of occurrence may also be changed when a plurality of modulation schemes are received.

For example, in the case of an apparatus which carries out impulse communication in a communication environment in which an impulse communication signal and an OFDM communication signal coexist, it is possible to reduce interference between apparatuses by convolving a template signal capable of receiving an impulse communication signal and a template signal capable of receiving an OFDM communication signal at the start of a communication, discovering, synchronizing, authenticating and demodulating an impulse communication signal of the communicating party, discovering an OFDM communication signal as well and adjusting communication timing or the like. After adjustment, it is also possible to perform control so as to increase a time during which an impulse communication signal can be received by reducing the frequency of occurrence of template signals capable of receiving an OFDM communication signal.

Embodiment 2

Figure 6:
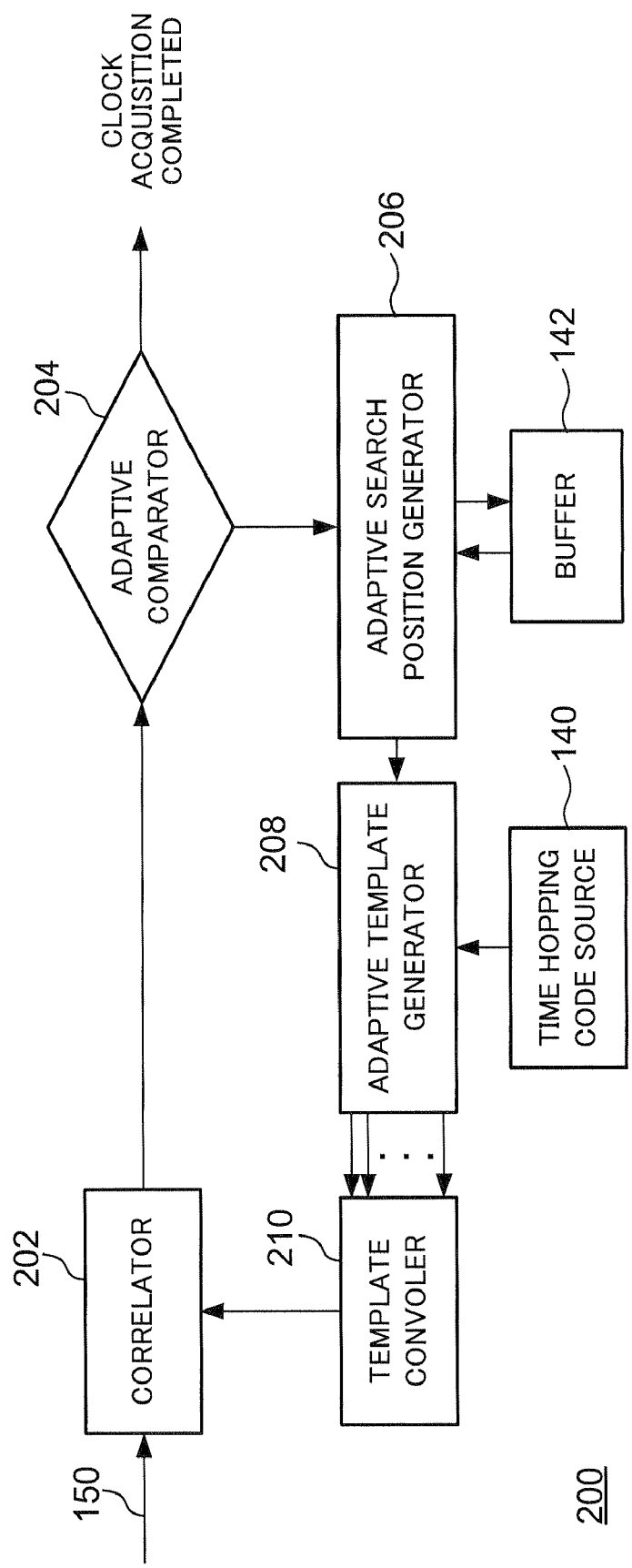
FIG. 6 is a block diagram showing the configuration of a clock acquisition apparatus according to Embodiment 2.

FIG. 6 is a block diagram showing the configuration of a clock acquisition apparatus according to Embodiment 2 of the present invention. Clock acquisition apparatus 200 which will be explained in this embodiment has a basic configuration similar to that of clock acquisition apparatus 100 explained in Embodiment 1. Therefore, the same components explained in Embodiment 1 will be assigned the same reference numerals without further explanations.

In addition to time hopping code source 140 and buffer 142 explained in Embodiment 1, clock acquisition apparatus 200 is provided with correlator 202, adaptive comparator 204, adaptive search position generator 206, adaptive template generator 208 and template convolver 210. Correlator 202 basically has the functions of both first correlator 112 and second correlator 132 explained in Embodiment 1. Adaptive comparator 204 basically has the functions of both first comparator 114 and second comparator 134 explained in Embodiment 1. Adaptive search position generator 206 basically has the function of both plural search position generator 122 and single search position generator 144 explained in Embodiment 1. Adaptive template generator 208 basically has the functions of both plural template generator 124 and single template generator 146. Template convolver 210 basically has the function of template convolver 126 explained in Embodiment 1.

Figure 7:
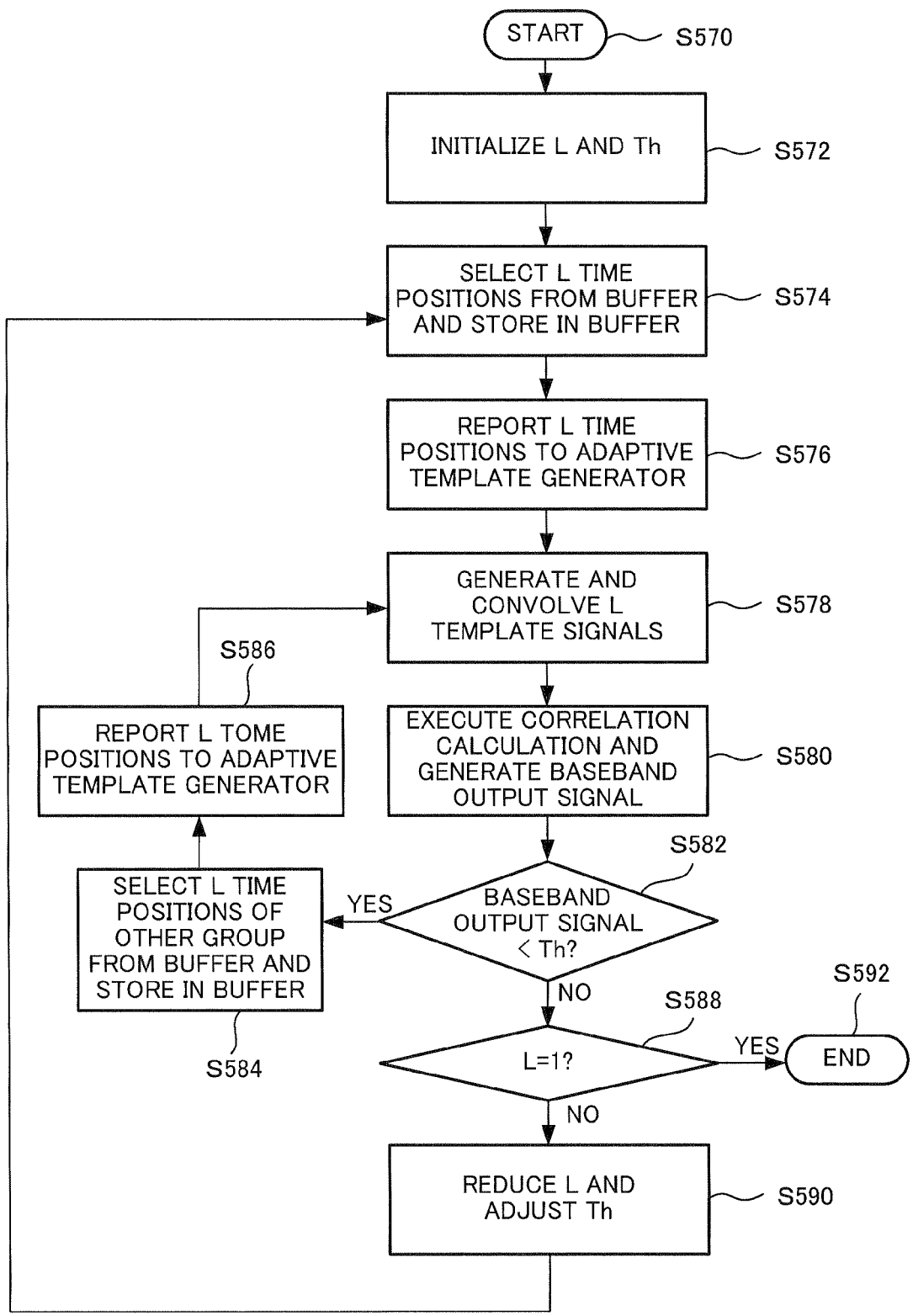
FIG. 7 is a flowchart illustrating a series of clock acquisition processing according to Embodiment 2.

Next, a series of clock acquisition processing executed at clock acquisition apparatus 200 which has the above-described configuration will be explained. FIG. 7 is a flowchart illustrating the clock acquisition processing of this embodiment. The series of clock acquisition processing basically includes the clock acquisition in two stages just as that explained in Embodiment 1. However, the number of time positions L which are selected upon acquisition of a convolved template signal (L is a natural number) in the clock acquisition processing of this embodiment is a variable (number M is a fixed value in Embodiment 1). This allows a series of clock acquisition processing including clock acquisition processing in multiple stages to be executed. The clock acquisition processing in the first stage starts with initialization of L, and the clock acquisition processing in each stage from the second stage onward starts with reduction of L. Furthermore, the clock acquisition processing executed when the value of L is set to 1 can be referred to as a "final stage", and all stages before this stage can be generically referred to as a "preliminary stage."

The clock acquisition processing starts in step S570. Then, in step S572, all parameters including the number of time positions L and threshold Th are initialized.

In step S574, adaptive search position generator 206 selects L time positions from all time positions from buffer 142 and stores the selected L time positions in buffer 142. In step S576, the selected L time positions are reported from adaptive search position generator 206 to adaptive template generator 208. In step S578, adaptive template generator 208 generates L template signals according to the reported L time positions and time hopping codes from time hopping code source 140, template convolver 210 convolves the generated L template signals and obtains a convolved template signal as a result. The flow then proceeds to step S580.

When the convolved template signal obtained in step S578 has a specific pulse arrangement, template convolver 210 can partially change the convolved template signal, especially the specific pulse arrangement.

An example of specific pulse arrangement is an arrangement in a convolved template signal in which a plurality of pulses are arranged neighboring each other without any time interval therebetween. When a convolved template signal which has such a pulse arrangement is generated, template convolver 210 decimates at least one pulse other than the start pulse in the pulse arrangement. When such a pulse arrangement exists, arrival timing $t_0$ may be erroneously detected depending on, for example, a situation of a transmission channel. Therefore, by performing the above-described decimation, it is possible to prevent erroneous detection of arrival timing $t_0$.

In step S580, correlator 202 multiplies received signal 150 by the convolved template signal, integrates the multiplication result, and as a result, obtains a baseband output signal which is an output signal of correlator 202. In the following explanations, a series of processing at correlator 202 will be referred to as "correlation calculation."

In step S582, adaptive comparator 204 compares the baseband output signal generated by the correlation calculation with threshold Th. When the baseband output signal is greater than threshold Th or equal to threshold Th (S582: NO), that is, when a correlation match is detected, the flow proceeds to step S588. When the baseband output signal is smaller than threshold Th (S582: YES), that is, when no correlation match is detected, the flow proceeds to step S584.

In step S584, because no correlation match has been detected, adaptive search position generator 206 reselects all the L time positions. More specifically, the L time positions which belong to a group different from the already selected time positions are newly selected from buffer 142. When the current value of L is a value after being adjusted in step S590, the selection of the new L time positions is limited to a specific range. That is, when the number of L is reduced in step S590, the selection of the new L time positions is applied to the reduced L time positions. Buffer 142 is updated with the reselected L time positions. The flow then proceeds to step S586.

In step S584, when the current value of L is not 1, all time positions in the above-described specific range have already been selected and the L time positions cannot be newly selected, clock acquisition processing is given up or clock acquisition processing is done over from the preceding stage or clock acquisition processing is done over from the first stage.

Furthermore, when the current value of L is 1, all time positions within the above-described specific range have already been selected and one time position cannot be newly selected, clock acquisition processing is done over from the preceding stage or clock acquisition processing is done over from the first stage.

In step S586, the adjusted L time positions are reported from adaptive search position generator 206 to adaptive template generator 208, and the flow returns to step S578.

In step S588, it is judged whether or not the current value of L is 1. When the current value of L is not 1 (S588: NO), the correlation match detected just before is not a final correlation match, that is, the correlation match detected just before is regarded as a preliminary correlation match. In this case, in step S590, the value of L is reduced. For example, the value of L is changed from the current value to a minimum integer which is not less than a value obtained by dividing the current value by 4. Furthermore, in accordance with a decrease in number L, threshold Th is adjusted.

That is, when L is 1, this means finally determined timing, and therefore final correlation is judged with relatively high threshold Th. Furthermore, when L is other than 1, timing at which a relatively high value is produced is selected from correlation values to select a candidate for time positions of synchronization using relatively low threshold Th.

The flow then returns to step S574 and clock acquisition processing in the next stage starts.

On the other hand, when the current value of L is 1, (S588: YES), the correlation match detected just before is regarded as a final correlation match. Therefore, the series of clock acquisition processing is completed (S592).

Since the initial value of number L when clock acquisition processing starts is an element which has a great influence on the required time and accuracy of the clock acquisition processing, the setting thereof is very important. As the value of L increases, interference within a group (that is, a plurality of convolved template signals interfere with each other) increases. In the case of a system in which a low duty cycle (Tp/Tf is small) is adopted, the value of L can be increased while suppressing interference within the group. Various methods can be used as the method of setting the initial value of number L.

For example, the initial value of L is variably set based on the quality (for example, a reception error rate) of a transmission channel of received signal 150. In other words, the number of the convolved template signals is variably set based on the quality of the transmission channel. More specifically, when the quality is good, a relatively small number of template signals are convolved and when the quality is not good, a relatively large number of template signals are convolved. By this means, it is possible to optimize the required time and accuracy of clock acquisition processing according to the quality of the transmission channel.

Alternatively, the initial value of L is variably set based on the reception power (for example, RSSI (Received Signal Strength Indicator) indicating the intensity of received signal 150) of received signal 150. In other words, the number of the convolved template signals is variably set based on the reception power. More specifically, when the reception power is relatively large, a relatively small number of template signals are convolved, and, when the reception power is relatively small, a relatively large number of template signals are convolved. By this means, it is possible to optimize the required time and accuracy of the clock acquisition processing according to the reception power.

Alternatively, the initial value of L is variably set based on information of the preceding series of clock acquisition processing, for example, a variance of the integration result at the time of the preceding clock acquisition processing at correlator 202. In other words, the number of the convolved template signals is variably set based on the information of the preceding series of clock acquisition processing. More specifically, when the variance is relatively small, a relatively small number of template signals are convolved, and, when the variance is relatively large, a relatively large number of template signals are convolved. By this means, it is possible to optimize the required time and accuracy of the clock acquisition processing according to the result of the clock acquisition processing in the past.

Alternatively, the initial value of L is variably set based on the number of times a series of clock acquisition processing is retried. In other words, the number of the convolved template signals is variably set based on the number of retrials. More specifically, when the number of retrials is relatively large, a relatively small number of template signals are convolved to shorten the processing time, and, when the number of retrials is relatively small, a relatively large number of template signals are convolved to improve accuracy rather than to shorten the processing time. By this means, it is possible to optimize the required time and accuracy of the clock acquisition processing according to the number of retrials.

Figure 8:
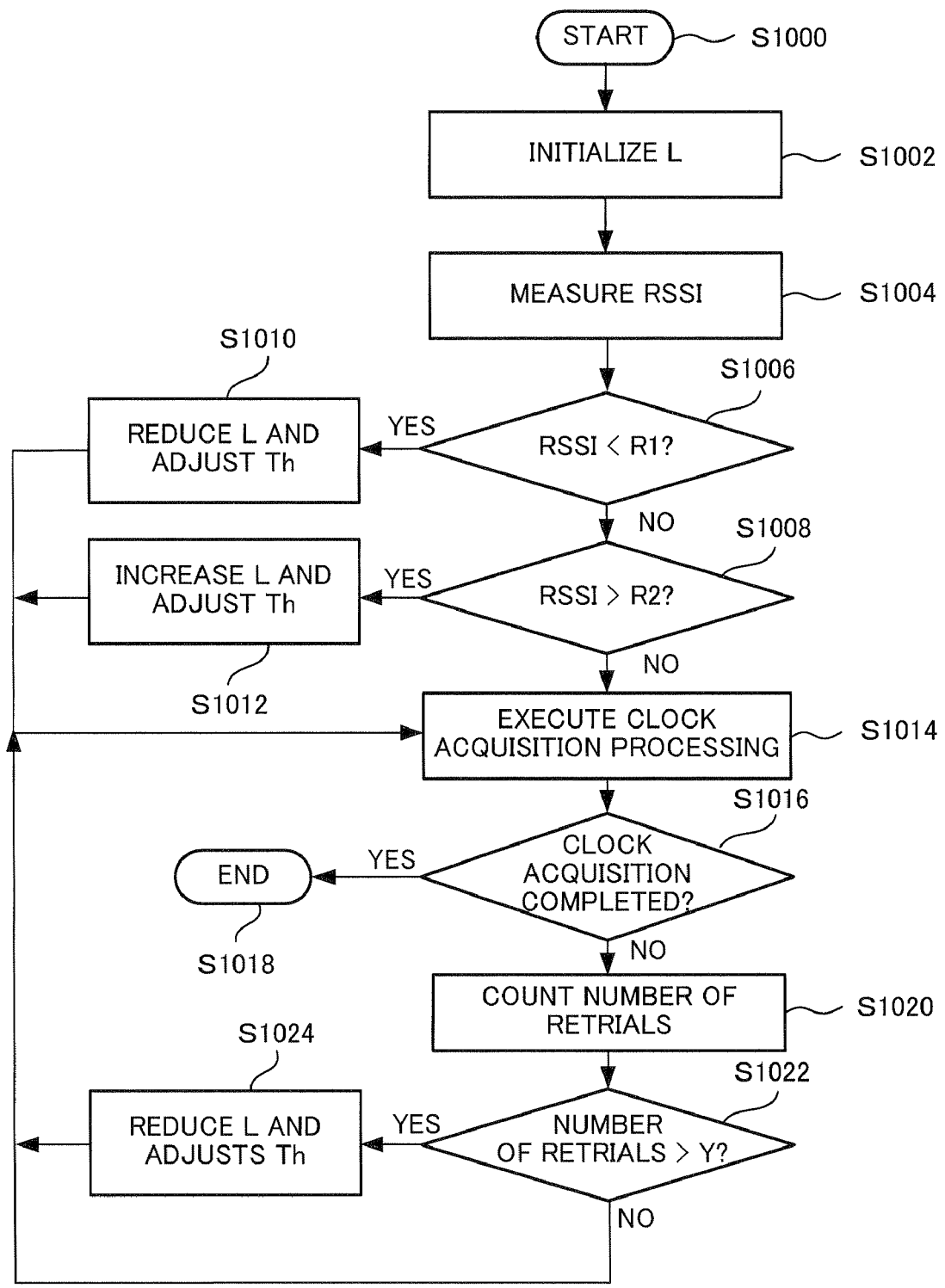
FIG. 8 is a flowchart illustrating initial value setting processing of the number of time positions according to Embodiment 2.

FIG. 8 is a flowchart illustrating an example of the initial value setting of number L of time positions.

The initial value setting processing starts in step S1000. In step S1002, the value of L is initialized. The value of L after the initialization is an arbitrary natural number equal to or greater than 2.

In step S1004, a measuring equipment (not shown) measures RSSI. In step S1006, RSSI is compared with predetermined threshold R1. When RSSI is smaller than threshold R1 (S1006: YES), the value of L is reduced, threshold Th is also adjusted correspondingly (S1010), and the flow proceeds to step S1014. On the other hand, when RSSI is greater than threshold R1 or equal to threshold R1 (S1006: NO), the flow proceeds to step S1008.

In step S1008, RSSI is compared with predetermined threshold R2 (R2>R1). When RSSI is larger than threshold R2 (S1008: YES), the value of L is increased. Threshold Th is also adjusted correspondingly (S1012), and the flow proceeds to step S1014. When RSSI is smaller than threshold R2 or equal to threshold R2 (S1008: NO), the flow proceeds to step S1014 without the value of L being increased or decreased.

In step S1014, the series of clock acquisition processing explained using, for example, FIG. 7 is executed. In step S1016, it is judged whether or not the clock acquisition processing is completed.

When the clock acquisition processing is not completed and clock acquisition processing is done over from the first stage (S1016: NO), the flow proceeds to step S1020, and, when the clock acquisition processing is completed (S1016: YES), the setting of the initial value is completed in step S1018. Furthermore, also when the clock acquisition processing is given up at some midpoint, the setting of the initial value is completed in step S1018. Furthermore, when the flow returns from the clock acquisition processing in a given stage to the clock acquisition processing in the preceding stage, the execution of clock acquisition processing in step S1014 is regarded as being in progress.

In step S1020, the number of retrials of a series of clock acquisition processing is counted and stored in buffer 142. The stored number of retrials is compared with predetermined threshold Y in step S1022.

When the number of retrials is larger than threshold Y (S1022: YES), the value of L is reduced in step S1024, and threshold Th is adjusted correspondingly. The flow then proceeds to step S1014. Furthermore, when the number of retrials is smaller than threshold Y or equal to threshold Y (S1022: NO), the flow proceeds to step S1014 without the value of L being reduced.

Figure 9:
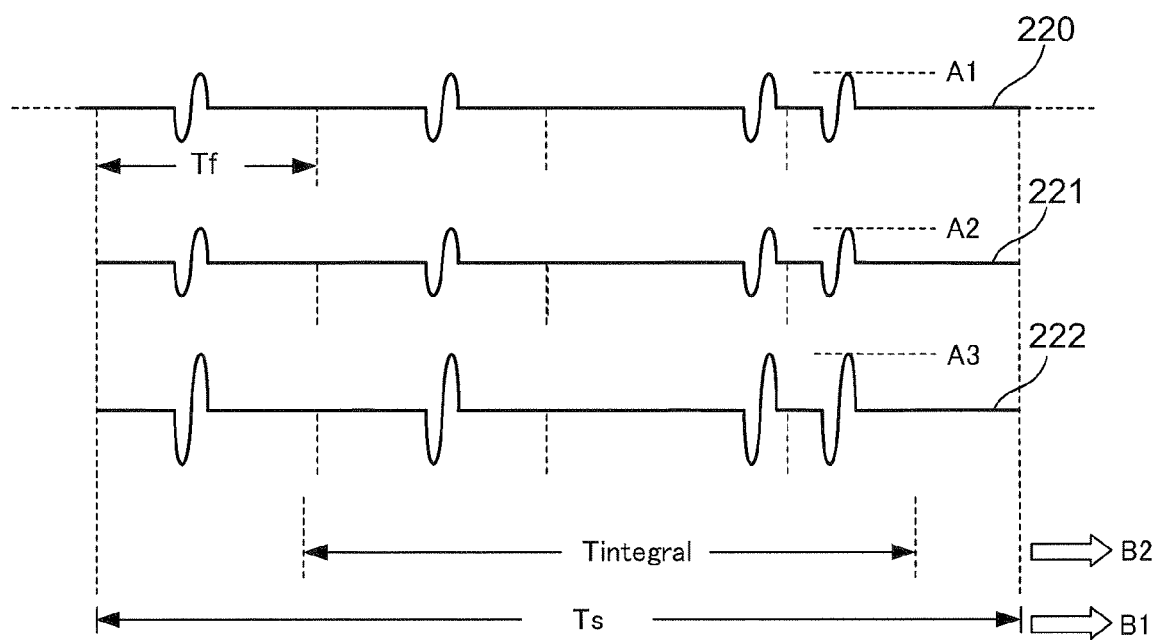
FIG. 9 illustrates an example of integration length control according to Embodiment 2.

Next, control of the integration length of integration executed at correlator 202 will be explained using FIG. 9.

Correlator 202 can variably set the length of integration section $T_{integral}$ to integrate the result of multiplying convolved template signal 221 having amplitude A2 (or a template signal) by received signal 220 having amplitude A1. Therefore, the integration length can also be set to a length equal to symbol frame duration Ts of the template signal or convolved template signal, and can be set to be shorter than symbol frame duration T2. Correlator 202 multiplies a template signal or a convolved template signal by received signal 220 over symbol frame duration Ts and integrates multiplication result 222 (having amplitude A3) over integration section $T_{integral}$.

Baseband output signal B2 obtained when the integration length of integration section $T_{integral}$ is set to be shorter than symbol frame duration Ts and baseband output signal B1 obtained when the integration length of integration section $T_{integral}$ is set to the same length as symbol frame duration Ts are compared with threshold Th set corresponding to the signals respectively.

Integration section $T_{integral}$ can be set to an arbitrary part in the symbol frame. When the integration length is shorter than symbol frame duration Ts, the time required for the clock acquisition processing can be shortened. However, in order to integrate a sufficient number of pulses to avoid missing of arrival timing to of received signal 220, the integration length must be longer than subframe duration Tf. For example, the integration length is set to Tf×3.

Furthermore, the integration length may be set to be short at first and then gradually set to be longer.

Alternatively, the integration length may also be set variably based on the quality (for example, reception error rate) of the transmission channel of received signal 220. More specifically, when the quality is good, the integration length is set to be long to shorten the time required for the clock acquisition processing, and, when the quality is not good, the integration length is set to be short to discover a plurality of arrival timing candidates earlier.

Alternatively, the integration length may also be variably set based on the reception power of received signal 220 (for example, RSSI). More specifically, when the reception power is relatively large, the integration length is set to be long to shorten the time required for the clock acquisition processing, and, when the reception power is relatively small, the integration length is set to be short to discover a plurality of arrival timing candidates earlier.

Alternatively, the integration length may also be set variably based on the information of the preceding series of clock acquisition processing, for example, the variance of the integration result of the preceding clock acquisition at correlator 202. More specifically, when the variance is relatively small, the integration length is set to be long to shorten the time required for the clock acquisition processing, and, when the variance is relatively large, the integration length is set to be short to discover a plurality of arrival timing candidates earlier.

Furthermore, as described above, integration section $T_{integral}$ can be set to an arbitrary part in the symbol frame. Preferably, a section during which correlation calculation should be performed with high priority can be set as integration section $T_{integral}$.

An example thereof will be explained in detail. Each template signal which is generated by adaptive template generator 208 and each convolved template signal which is generated by template convolver 210 have a first combination including a plurality of partial signals having relatively high correlation and a second combination including a plurality of partial signals having relatively low correlation. Therefore, correlator 202 integrates the result of multiplying all partial signals included in the first combination by the parts which correspond to the partial signals in received signal 220. When the integration result exceeds a predetermined threshold, a procedure of gradually setting integration section $T_{integral}$ to be longer and making a decision against a threshold again is repeated. Finally, when the result of correlation calculation between the whole convolved template signal or the whole template signal, and received signal 220 exceeds a desired threshold, it is possible to judge that the clock acquisition has completed.

In this way, according to this embodiment, the configuration of the whole apparatus can be made simpler by adding adaptive control of each parameter (such as L and Th).

Clock acquisition apparatus 200 of this embodiment is based on the configuration of only a series search, but the configuration of a parallel search may also be introduced to clock acquisition apparatus 200. For example, a plurality of correlators 202 are used in parallel in each stage. This makes it possible to realize further speed enhancement of clock acquisition.

Figure 11:
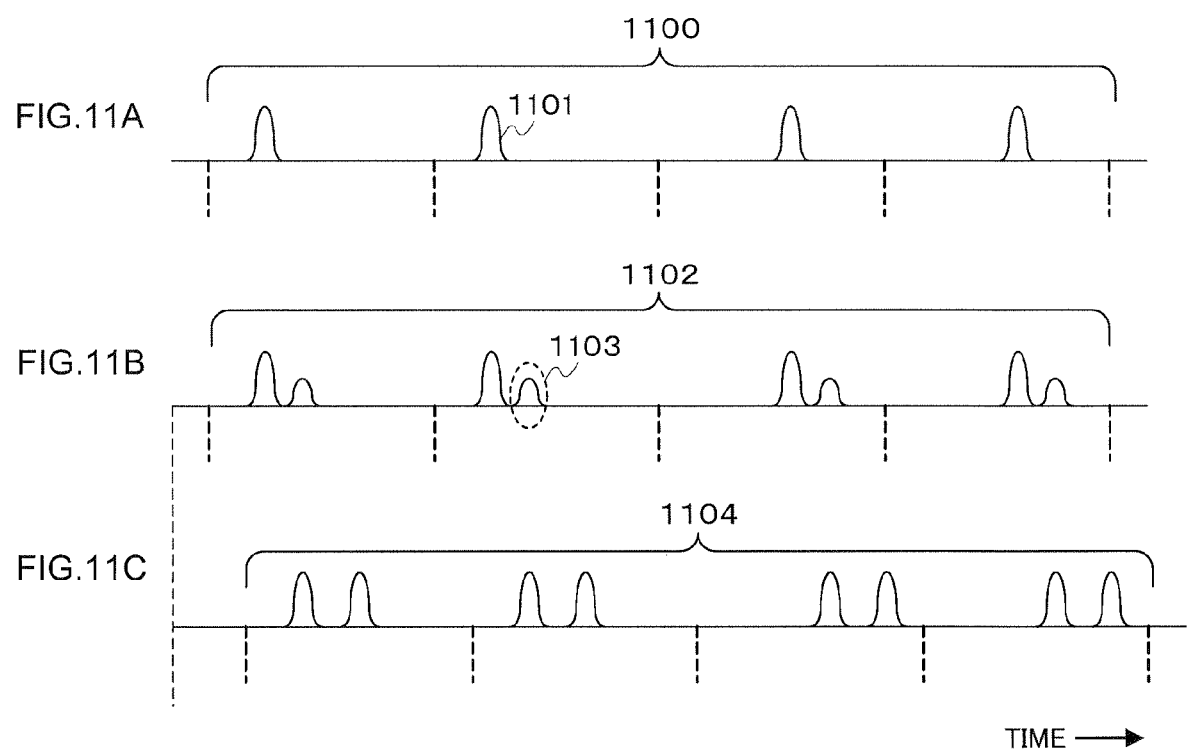
FIG. 11 illustrates a transmission signal, a received signal including multipath and a convolved template.
Figure 12A:
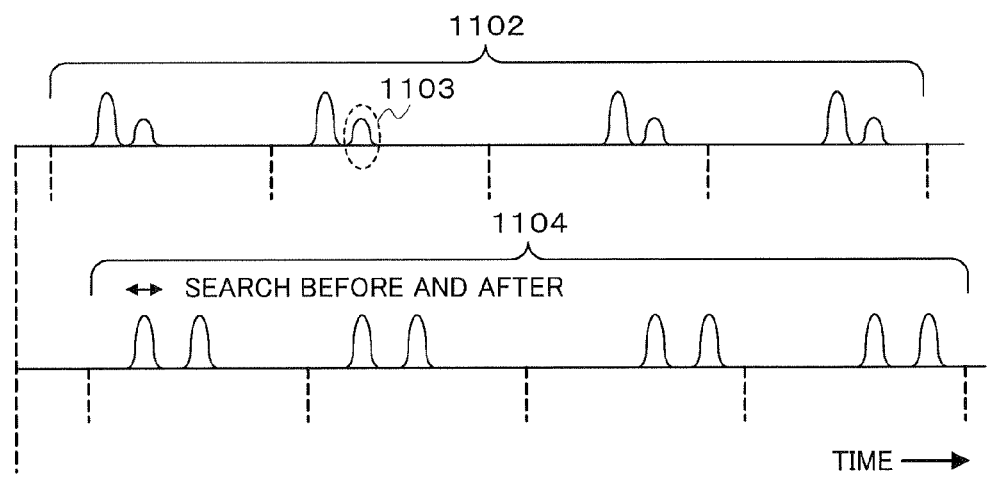
FIG. 12 illustrates a clock acquisition method when the received signal includes multipath.
Figure 12B:
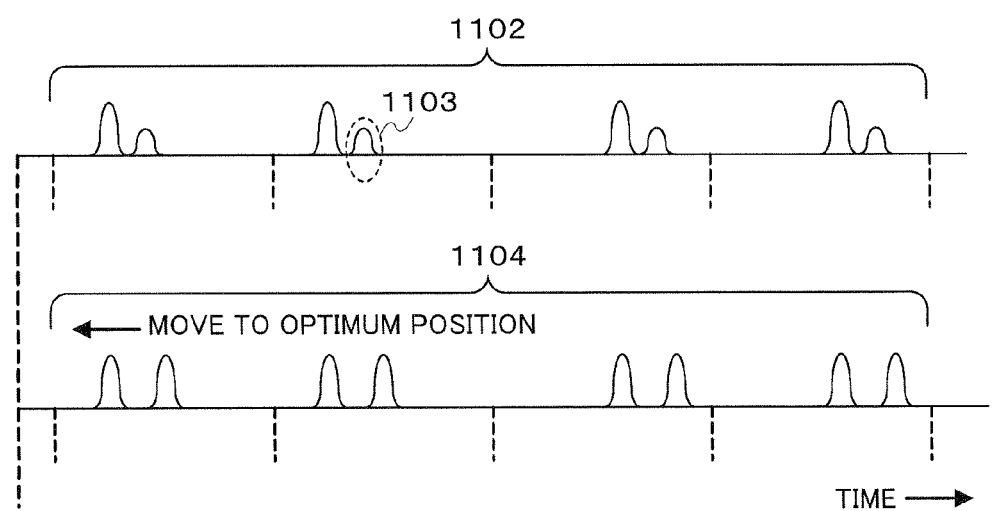
Figure 13A:
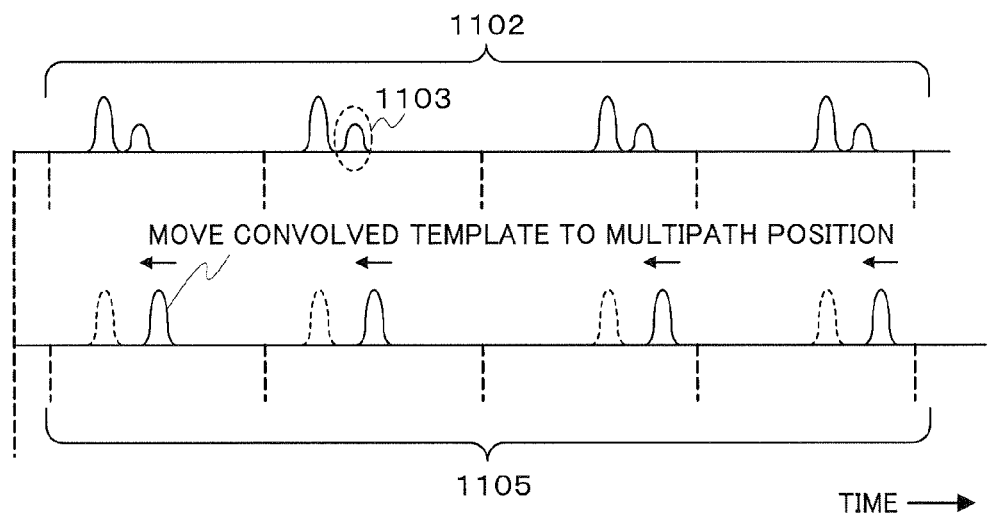
FIG. 13 illustrates another clock acquisition method when the received signal includes multipath.
Figure 13B:
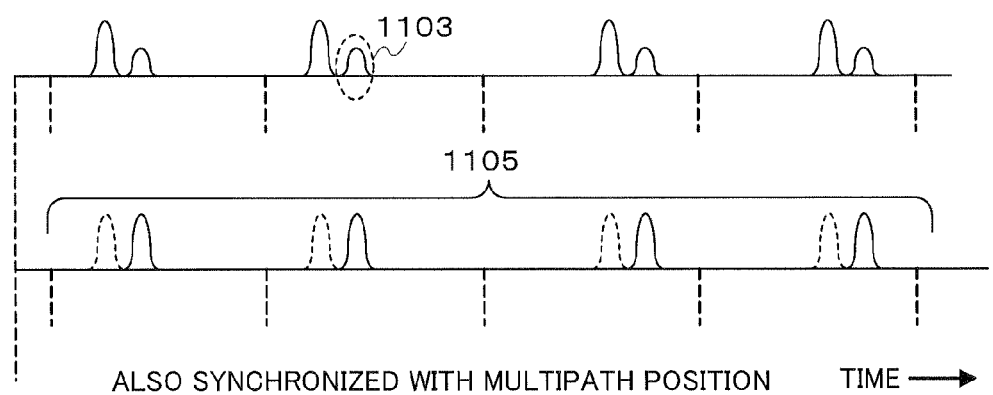

In the above explanations, an example has been described where templates to be convolved are changed based on reception power, but it is also possible to judge a multipath state and change templates to be convolved. This will be explained using FIGS. 11 and 12. Reference numeral 1100 in FIG. 11A is a transmission signal, and 1101 is a pulse. Reference numeral 1102 in FIG. 11B is a received signal, and pulse 1103 due to a multipath wave exists. Reference numeral 1104 in FIG. 11C is a convolved template signal. As a result of adjusting a delay time so that received signal 1102 and a convolved template signal match, a multipath wave is acquired. FIG. 12A shows a state in which optimum points are further being searched and by searching before and after pulse 1103 which is a multipath wave, a signal having greater amplitude ahead of the pulse is discovered and a synchronization state is moved to the optimum point as shown in FIG. 12B. Furthermore, as shown in FIG. 13, a convolved template may also be changed. FIG. 13A shows a situation in which template 1105 (indicated by solid lines) at a time which is different from the time synchronized with the optimum point (template indicated by dotted lines) is changed to a time of multipath wave, and, as shown in FIG. 13B, since this also causes synchronization with the multipath position, it is possible to improve reception sensitivity through a combination of correlation signals and maintain synchronization even when a specific path is shut off due to shadowing, for example.

Figure 14:
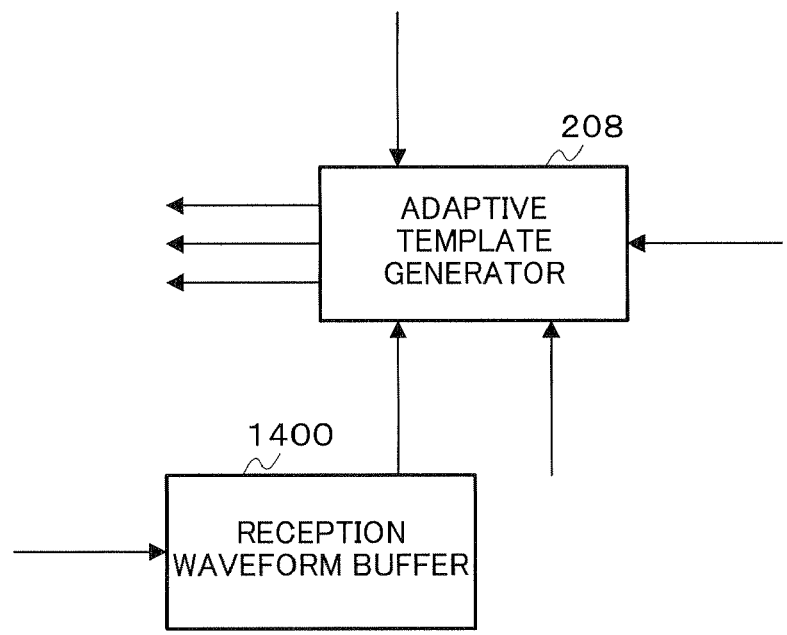
FIG. 14 is a block diagram showing the configuration of a clock acquisition apparatus when the waveform of the received signal is used as a template signal.
Figure 15:
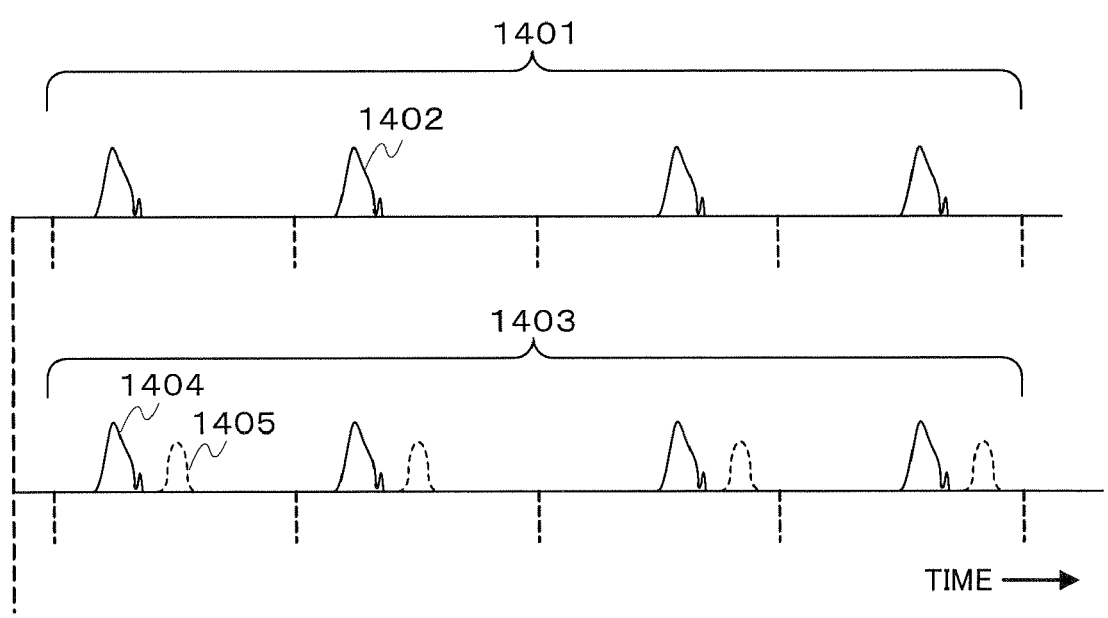
FIG. 15 illustrates a convolved template when the waveform of the received signal is used as a template signal.

In the above-described explanations, an example has been described where only templates inside are convolved and changed, but a reception waveform may also be used as one of the templates. FIG. 14 shows an addition function of the part which uses a received signal as a template. The difference between FIG. 14 and FIG. 6 is that reception waveform buffer 1400 is provided and the waveform thereof is inputted to adaptive template generator 208 so as to be convolved and used as a template. FIG. 15 shows a convolved template using a reception waveform. Reference numeral 1401 is a received signal, and 1402 is the reception waveform of a pulse. Reference numeral 1403 is a convolved template, 1404 is a template (indicated by a solid line) of the reception waveform pulse inputted from reception waveform buffer 1400, and 1405 is a template of a pulse generated inside (indicated by a dotted line). Using such reception waveform as a template makes it possible to obtain higher waveform correlation and accurately perform clock acquisition.

Figure 16A:
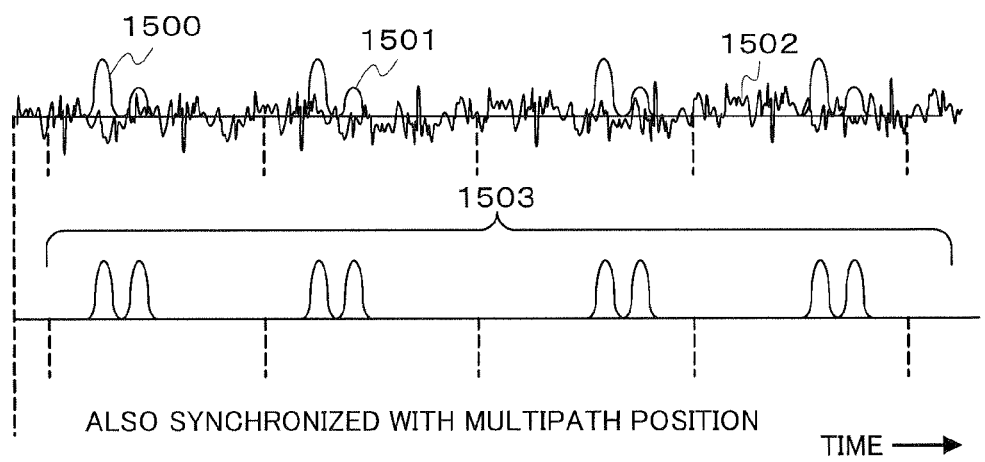
FIG. 16 illustrates a clock acquisition method when noise is convolved with the received signal.
Figure 16B:
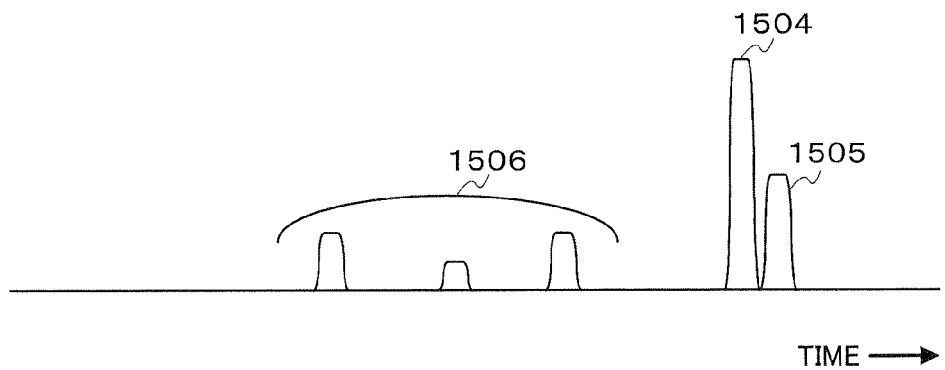

In the above-described explanations, the correlation has been described as being equal to or above a threshold as a clock acquisition state, but wrong correlation due to noise and second or third correlation due to multipaths are actually detected. FIG. 16 shows such a situation. FIG. 16A shows states of a received signal and a convolved template, reference numeral 1500 is a pulse having a largest voltage which is suitable for synchronization, 1501 is a pulse having a low voltage due to a multipath, and 1502 is noise. Reference numeral 1503 is a convolved template which is synchronized even at the multipath position. FIG. 16B shows a situation of correlation peaks in this state. Reference numeral 1504 is a peak corresponding to correlation with an optimum pulse, 1505 is a peak corresponding to correlation with a multipath, and 1506 is a peak corresponding to correlation with noise. In order to detect an optimum peak and complete preliminary detection correctly, when, for example, a plurality of correlation peaks are detected, it is only necessary to decide that a peak with the highest correlation is regarded as synchronization, and in order to avoid wrong peaks, it is only necessary to regard the existence of a peak for a predetermined time as a decision condition.

Figure 17A:
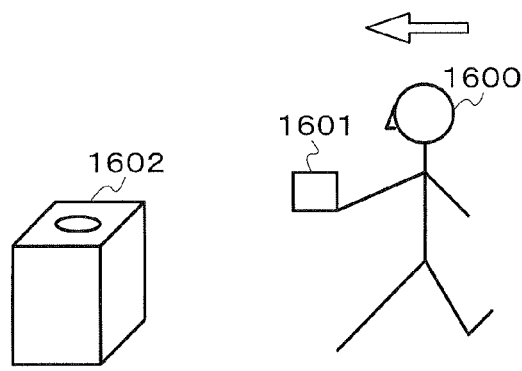
FIG. 17 illustrates an embodiment which changes the number of convolved templates according to a communication rate.
Figure 17B:
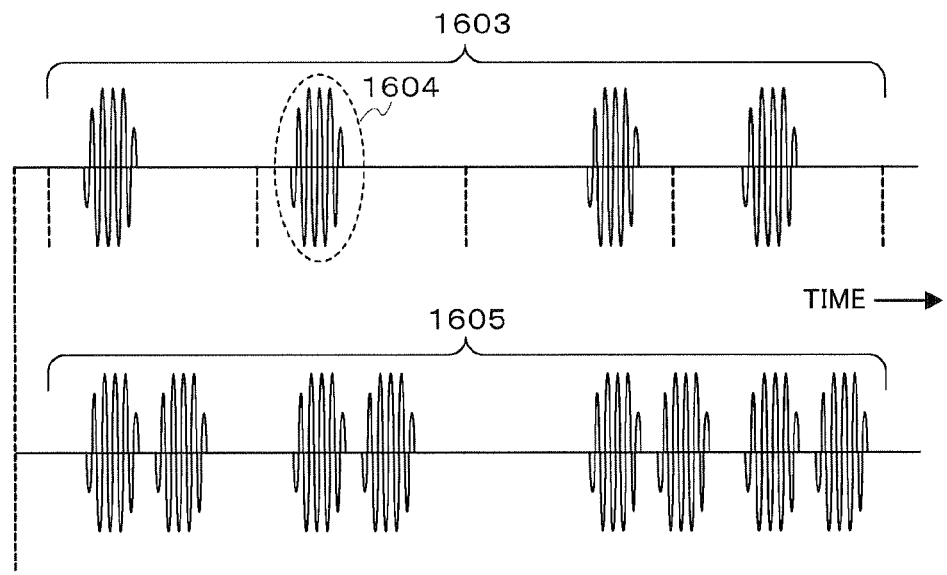
Figure 17C:
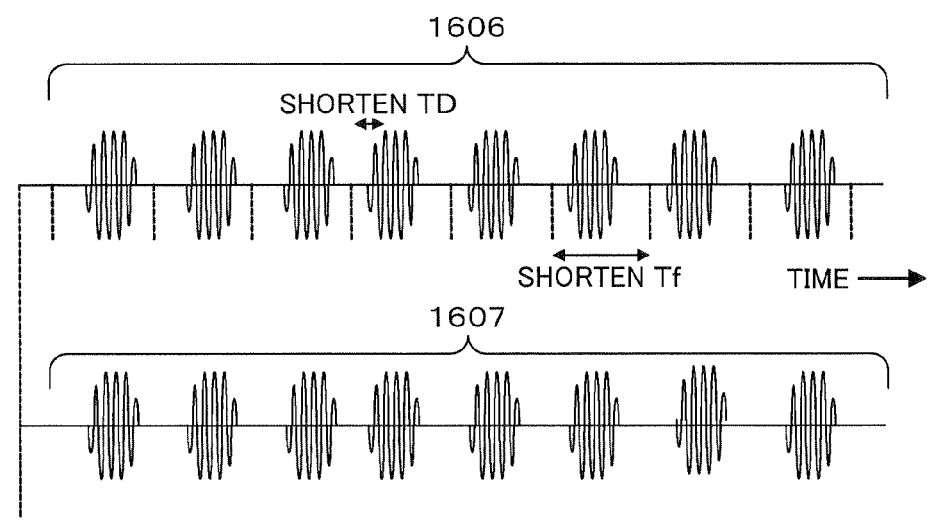

In the above-described explanations, an example has been described where the number of convolved templates is changed according to a synchronization state, and FIG. 17 shows an example where the number of convolved templates is changed according to a communication rate. FIG. 17A shows an image of arrangement of communication equipments. User 1600 holds terminal 1601 which is used in a mode in which data is downloaded from data holder 1602. When the distance between data holder 1602 and terminal 1601 is large, the radio wave which reaches terminal 1601 from data holder 1602 is weak, and the ratio of reception power to noise at terminal 1601 is small, and therefore it is likely to occur reception errors. Furthermore, the difference in path lengths between a direct wave and reflected or diffracted wave is small, that is, the power ratio or difference in arrival times is small, and therefore a state becomes a communication state with many multipaths. In this state, the ratio of reception power to noise can be increased by lowering a pulse repetition period and also increasing the amplitude of each pulse, and the interference between symbols can be reduced by lowering a pulse repetition period. It is unsuitable to increase a communication rate in such a state, but the processing such as initial synchronization between apparatuses and authentication is possible. Following this state, user 1600 approaches data holder 1602. The reception power increases and reception errors are reduced correspondingly. As for multipaths, too, differences in paths between a direct wave and reflected or diffracted wave increase, and therefore the power ratio increases and the influence thereof decreases. In this state, it is possible to set a pulse repetition period to a high level and increase a communication rate. Increasing the communication rate results in a shortening of the download time and has the effect of keeping confidentiality of data and suppressing power consumption of the apparatus to a low level. FIG. 17B shows a case where the communication rate is low, reference numeral 1603 is a received signal, and 1604 is a pulse. Reference numeral 1605 is a convolved template in which a plurality of templates having different start times are convolved. FIG. 17C shows received signal 1606 when the communication rate is high, and Tf and TD of the received signal are made shorter than a low rate period to shorten the pulse repetition period. In this case, since there are no more pulse intervals to be convolved in template 1607, the template is not convolved. In the above-described explanations, an example has been described where the number of the convolved templates is changed from 2 to 1 (not convolved) but it goes without saying that the same applies when the number of the convolved templates is simply reduced, for example, from 10 to 5.

The embodiments of the present invention have been explained so far, but the clock acquisition apparatus and the clock acquisition method according to the present invention are not limited to the above-described embodiments, and can be implemented modified in various ways. For example, the respective embodiments may be implemented in combination as appropriate. Furthermore, in the above-described embodiments, the case has been described as an example where the present invention is configured by hardware, but the present invention can also be implemented by software.

The present application is based on Japanese Patent Application No. 2005-252140, filed on Aug. 31, 2005 and Japanese Patent Application No. 2006-231094, filed on Aug. 28, 2006, the entire content of which is expressly incorporated by reference herein.

INDUSTRIAL APPLICABILITY

The clock acquisition apparatus and the clock acquisition method of the present invention are suitable for use in an impulse radio communication.

The invention claimed is:

1. A clock acquisition apparatus that performs clock acquisition for an impulse radio communication, comprising:
   an acquisition section that acquires a plurality of convolved template signals, each formed by convolving a plurality of template signals;
   a preliminary detection section that detects a preliminary correlation match between one convolved template signal acquired by the acquisition section and a received signal, and, when the preliminary correlation match between the one convolved template signal and the received signal is not detected, substitutes another convolved template signal acquired by the acquisition section for the one convolved template signal and then detects the preliminary correlation match; and
   a final detection section that detects, when the preliminary detection section detects the preliminary correlation match, a final correlation match between (i) any one of the template signals out of the plurality of template signals and (ii) the received signal.

2. The clock acquisition apparatus according to claim 1, wherein the acquisition section convolves a plurality of template signals having start time positions which are different from each other.

3. The clock acquisition apparatus according to claim 1, wherein:
   the plurality of template signals have start time positions which are different from each other;
   integer multiples of time resolution of the start time positions correspond to pulse widths; and
   the acquisition section convolves the one template signal and the another template signal.

4. The clock acquisition apparatus according to claim 3, wherein the acquisition section allows overlapping of pulses which occurs when the one template signal and the another template signal are convolved.

5. The clock acquisition apparatus according to claim 1, wherein the acquisition section variably sets the number of template signals convolved on each other based on quality of a transmission channel of the received signal.

6. The clock acquisition apparatus according to claim 1, wherein the acquisition section variably sets the number of template signals convolved on each other based on reception power of the received signal.

7. The clock acquisition apparatus according to claim 1, wherein the acquisition section variably sets the number of template signals convolved on each other based on information of a preceding series of clock acquisition processing including detection of the preliminary correlation match and the final correlation match executed by the preliminary detection section and the final detection section, respectively.

8. The clock acquisition apparatus according to claim 1, wherein the acquisition section variably sets the number of template signals convolved on each other based on the number of retrials of a series of clock acquisition processing including detection of the preliminary correlation match and the final correlation match executed by the preliminary detection section and the final detection section, respectively.

9. The clock acquisition apparatus according to claim 1, further comprising an integration length setting section that sets an integration length which is shorter than the duration of the plurality of template signals,
   wherein any one of the preliminary detection section and the final detection section integrates the result of multiplying a convolved template signal or template signal by the received signal over the integration length set by the integration length setting section.

10. The clock acquisition apparatus according to claim 9, wherein the integration length setting section variably sets the integration length based on quality of a transmission channel of the received signal.

11. The clock acquisition apparatus according to claim 9, wherein the integration length setting section variably sets the integration length based on the reception power of the received signal.

12. The clock acquisition apparatus according to claim 9, wherein the integration length setting section variably sets the integration length based on information of the preceding series of clock acquisition processing including detection of the preliminary correlation match and the final correlation match executed by the preliminary detection section and the final detection section, respectively.

13. The clock acquisition apparatus according to claim 1, wherein the acquisition section acquires the one convolved template signal or the another convolved template signal by partially changing the convolved template signal having a plurality of neighboring pulses without any time interval out of the plurality of convolved template signals.

14. The clock acquisition apparatus according to claim 13, wherein the acquisition section decimates any one pulse other than a start pulse out of the plurality of pulses.

15. The clock acquisition apparatus according to claim 1, wherein:
  each of the plurality of template signals and each of the plurality of convolved template signals comprise a first combination including a plurality of partial signals having relatively high correlation and a second combination including a plurality of partial signals having relatively low correlation; and
  any one of the preliminary detection section and the final detection section integrates the result of multiplying the first combination by the received signal.

16. A clock acquisition method for performing clock acquisition for an impulse radio communication, comprising the steps of:
  acquiring one convolved template signal formed by convolving a plurality of template signals;
  detecting a preliminary correlation match between the one convolved template signal and a received signal;
  acquiring, when the preliminary correlation match between the one convolved template signal and the received signal is not detected, another convolved template signal formed by convolving the plurality of template signals;
  detecting the preliminary correlation match after substituting the another convolved template signal for the one convolved template signal; and
  detecting, when the preliminary correlation match is detected, a final correlation match between (i) any one of the template signals out of the plurality of template signals and (ii) the received signal.

17. The clock acquisition apparatus according to claim 1, wherein the acquisition section comprises a plural search position generation section that selects a template signal whose bit sequence is determined according to a pulse position and pulse amplitude.

18. The clock acquisition apparatus according to claim 17, wherein the template signal is a signal whose bit sequence is determined based on any one of the pulse position and pulse amplitude and then determined based on the other.

19. The clock acquisition apparatus according to claim 1, wherein the plurality of template signals are signals in different carrier frequency bands.

20. The clock acquisition apparatus according to claim 19, wherein signals in a microwave band and signals in a millimeter wave band are used as the carrier frequency bands of the plurality of template signals.

21. The clock acquisition apparatus according to claim 1, wherein the plurality of template signals are signals of different modulation schemes.

22. The clock acquisition apparatus according to claim 1, wherein the plurality of template signals are convolved with different frequencies of occurrence.

* * * * *